US006993016B1

(12) United States Patent
Liva et al.

(10) Patent No.: US 6,993,016 B1
(45) Date of Patent: Jan. 31, 2006

(54) METHODS AND APPARATUS FOR TRANSMISSION OF ANALOG CHANNELS OVER DIGITAL PACKET NETWORKS

(75) Inventors: Valentino Liva, Los Altos, CA (US); Alok Sharma, San Jose, CA (US); Lance Smith, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 781 days.

(21) Appl. No.: 09/715,992

(22) Filed: Nov. 16, 2000

(51) Int. Cl.
*H04L 12/66* (2006.01)

(52) U.S. Cl. ....................... 370/356; 370/465; 725/106

(58) Field of Classification Search ................ 370/389, 370/203, 204, 210, 351, 352, 356, 465, 468, 370/470, 474, 477, 442, 478, 480, 484, 486, 370/487; 725/118, 119, 105, 106, 114; 375/130, 375/229
See application file for complete search history.

(56) References Cited

U.S. PATENT DOCUMENTS

| | | | | |
|---|---|---|---|---|
| 5,361,091 | A | 11/1994 | Hoarty et al. | 725/119 |
| 5,528,582 | A | 6/1996 | Bodeep et al. | 370/276 |
| 5,590,156 | A | 12/1996 | Carney | 375/316 |
| 5,841,468 | A | 11/1998 | Wright | 725/119 |
| 5,878,325 | A | 3/1999 | Dail | 725/125 |
| 5,930,231 | A * | 7/1999 | Miller et al. | 370/210 |
| 6,021,158 | A * | 2/2000 | Schurr et al. | 375/211 |
| 6,088,399 | A | 7/2000 | Luz et al. | 375/260 |
| 6,160,572 | A | 12/2000 | Matsuura | 725/126 |
| 6,233,235 | B1 | 5/2001 | Burke et al. | 370/356 |
| 6,236,678 | B1 | 5/2001 | Horton, Jr. et al. | 375/222 |
| 6,263,195 | B1 | 7/2001 | Niu et al. | 455/150.1 |
| 6,282,184 | B1 | 8/2001 | Lehman et al. | 370/342 |
| 6,356,374 | B1 * | 3/2002 | Farhan | 398/191 |
| 6,449,071 | B1 * | 9/2002 | Farhan et al. | 398/79 |
| 6,519,773 | B1 * | 2/2003 | Ahmed et al. | 725/118 |
| 6,608,837 | B1 * | 8/2003 | Brodigan | 370/432 |
| 6,768,722 | B1 * | 7/2004 | Katseff et al. | 370/260 |
| 6,778,525 | B1 * | 8/2004 | Baum et al. | 370/351 |

OTHER PUBLICATIONS

US International Search Authority, International Search Report, PCT/USO1/45799, Mailed May 3,2002, Washington, D.C. 20231.

Valentino Liva et al., co-pending U.S. Appl. No. 10/033,383, filed Oct. 24, 2001, entitled "Enhanced CMTS For Reliability, Availability, and Serviceability", 58 pp.

Valentino Liva et al., co-pending U.S. Appl. No. 10/033,378, filed Oct. 24, 2001, entitled "Enhanced Fiber Nodes with CMTS Capability", 73 pp.

* cited by examiner

*Primary Examiner*—Brian Nguyen
(74) *Attorney, Agent, or Firm*—Harrity & Snyder LLP

(57) ABSTRACT

Methods and apparatus are provided for tunneling (transparently transmitting) over a packet network, from a source to a destination, the spectrum of one or more bandpass channels individually selected from a larger spectrum at the source. Each channel is selected, translated to baseband (using sampling techniques), digitized, framed, merged with other digital services, transmitted (along with associated attribute information) using packet techniques, and later reconstructed. The present invention provides a selective and efficient use of available bandwidth, in that it is not necessary to transmit the entire spectrum, when only one or few portions of the spectrum are desired. This in turn, reduces bandwidth requirements all along the transmission path and at the source and destination. The reduced bandwidth requirements have associated reductions in power and costs.

14 Claims, 22 Drawing Sheets

METHODS AND APPARATUS FOR TRANSMISSION OF ANALOG CHANNELS OVER DIGITAL PACKET NETWORKS

BACKGROUND

In traditional Hybrid Fiber-Coax (HFC) systems for Cable Television systems, Fiber Nodes (FN) are intermediate subsystems in an overall information distribution network hierarchy. From least to highest bandwidth concentration, the network hierarchy includes subscribers (generally homes), FNs, secondary hubs (SHs), primary hubs, and the headend. Information is "distributed" downstream (from provider to subscriber).

FNs interface with the SHs optically and interface with the subscribers over active RF coaxial networks (i.e., networks of coaxial cable interspersed with active RF distribution amplifiers as required for signal integrity). FNs may serve between 600 and 1200 subscribers. This can be accomplished by segmenting the total number of subscribers into "buses" of 300 subscribers. A cascade of five to eight RF amplifiers may exist between the FN and any given subscriber. Four to six fibers may couple the FN to a SH.

FIGS. 1A through 1C illustrate a prior-art HFC cable system having legacy return channels. More particularly, the illustrated legacy return channels are for conventional analog telephone service. FIG. 1A is a top-level view of the cable system, including the cable system head-end and the customer premises equipment (CPE). FIG. 1B provides additional detail of the CPE of FIG. 1A. FIG. 1C provides additional detail of the NID of FIG. 1B.

Recent variants to the above HFC architecture have been based on so-called mini fiber nodes (mFNs), a FN variant that is both smaller and deeper into the network (closer to the subscriber) than a traditional FN. However, mFNs are generally distinguished from FNs in that they interface with only 50 to 100 subscribers and the path from mFN to subscriber is via an all passive coaxial network. The mFN distributes downstream information to the subscribers and aggregates upstream information from subscribers. The mFN interfaces via optical fiber to the next higher level in the hierarchy.

There are many possible topologies for mFN-based HFC systems and the exact functionality of an mFN will vary with the system topology. In a first example, MFNs can be used as part of a fiber overlay to upgrade traditional "trunk-and-branch" coaxial systems, or HFC systems with downstream only FNs, with digital return path (upstream) services. In such applications, the optical return (upstream) path is routed from the mFN directly to the SH, bypassing the downstream only path (which in an HFC system includes FNs). This in effect configures each line extender with a return fiber that provides each passive span with a unique return spectrum. FIGS. 2A and 2B illustrate such a prior-art HFC cable system having a packet fiber overlay using mini-FiberNodes (mFNs). FIG. 2A is a top-level view of the HFC/mFN cable system. FIG. 2B provides additional detail of the mFNs of FIG. 2A. In a second example, mFNs can be used with "MuxNodes" that replace a single FN or consolidate multiple FNs. MuxNodes not only distribute information downstream but also "aggregate" information upstream (from subscriber to provider).

A general discussion of HFC architectures, with a particular focus on mFN-based systems, is provided by the article "HFC architecture in the making: Future-proofing the network," by Oleh Sniezko, et al, in the July 1999 issue of Communications Engineering & Design Magazine (CED Magazine), published by Cahners Business Information, a member of the Reed Elsevier plc group.

"DOCSIS" is a family of interoperability certification standards for cable modems that are based on TCP/IP protocols. "OpenCable" is a family of interoperability specifications directly and indirectly related to digital set-top box hardware and software interfaces. "PacketCable" is a family of specifications aimed at facilitating real-time, multimedia packet-based services, using a DOCSIS-managed IP backbone as the foundation. While having broad applicability, an initial focus of PacketCable is VoIP (Voice over Internet Protocol). Cable Television Laboratories, Inc. (CableLabs), with offices in Louisville, Colo., is a research and development consortium of North and South American cable television operators. CableLabs manages, publishes, and distributes a number of specifications and certification standards related to various aspects of Cable Television systems, including the DOCSIS, OpenCable, and PacketCable standards families.

The International Telecommunications Union (ITU), headquartered in Geneva, Switzerland, is "an international organization within which governments and the private sector coordinate global telecom networks and services." The ITU manages, publishes, and distributes a number of international telecom related standards. Standards relevant to Cable Television systems include the ITU-T Series H Recommendations and the ITU-T Series J Recommendations. The "-T" stands for Telecommunications. Series H covers all ITU-T standards for "audiovisual and multimedia systems." Series J covers all ITU-T standards for "transmission of television, sound programme and other multimedia signals."

BRIEF DESCRIPTION OF DRAWINGS

FIG. 1A is a top-level view of the cable system. FIG. 1B provides additional detail of the CPE of FIG. 1A. FIG. 1C provides additional detail of the NID of FIG. 1B.

FIG. 2A is a top-level view of the HFC/mFN cable system. FIG. 2B provides additional detail of the mFNs of FIG. 2A.

FIG. 3A is a top-level view of the mFN/mini-CMTS. FIG. 3B provides additional detail of the DSP Multi-Channel Transceiver ASIC of FIG. 3A. FIG. 3C provides detail of the underlying structure for the MAC processor and shared memory of FIG. 3A. FIG. 3D provides additional detail of the Analog Combine and Split Functions of FIG. 3A.

FIG. 4A shows the 5–42 MHz return spectrum, including a desired 6 MHz legacy return channel. FIG. 4B represents a low-pass (anti-alias) filtering operation performed in the analog domain. FIG. 4C represents a band-pass (channel isolation) operation performed in the digital domain. FIG. 4D represents a resampling (baseband conversion) operation in the digital domain. FIG. 4E represents a low-pass filter and decimation operation performed in the digital domain.

FIG. 7A is a view that focuses on the relationship between the head-end and the customer premises. FIG. 7B is a view that focuses on the relationship between the cable-system head-end and other networks.

SUMMARY

Figure 1A:
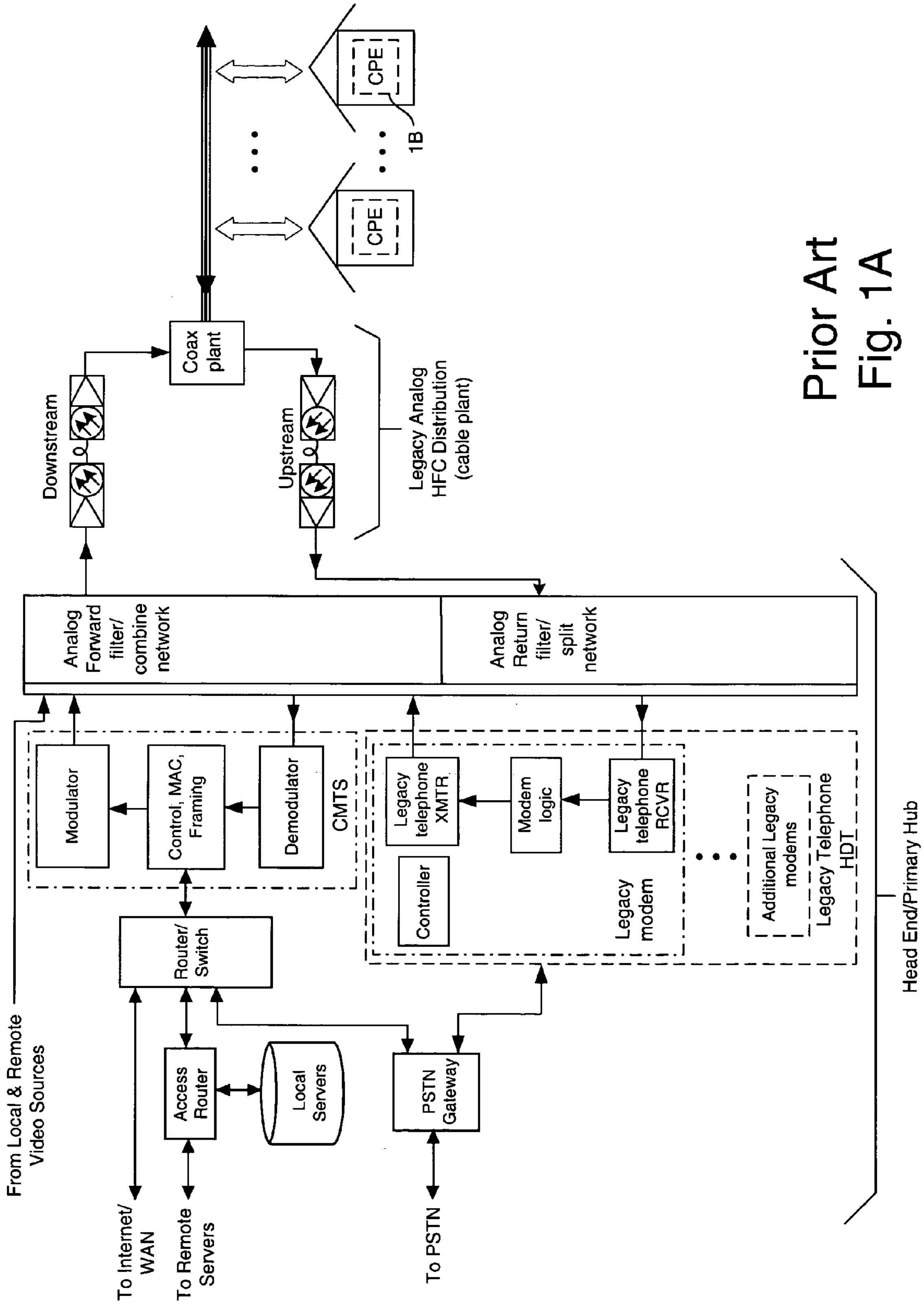
FIGS. 1A through 1C illustrate a prior-art HFC cable system having legacy return channels.
Figure 1B:
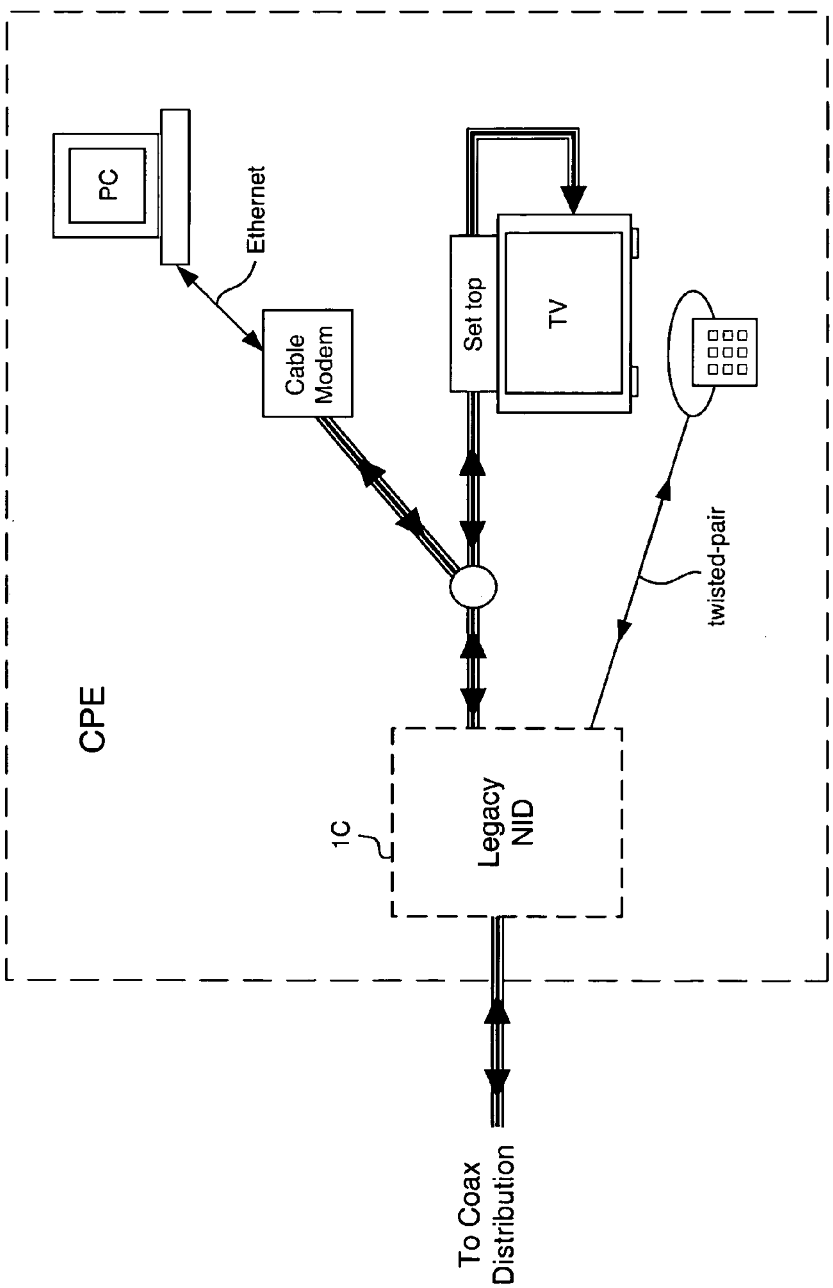
Figure 1C:
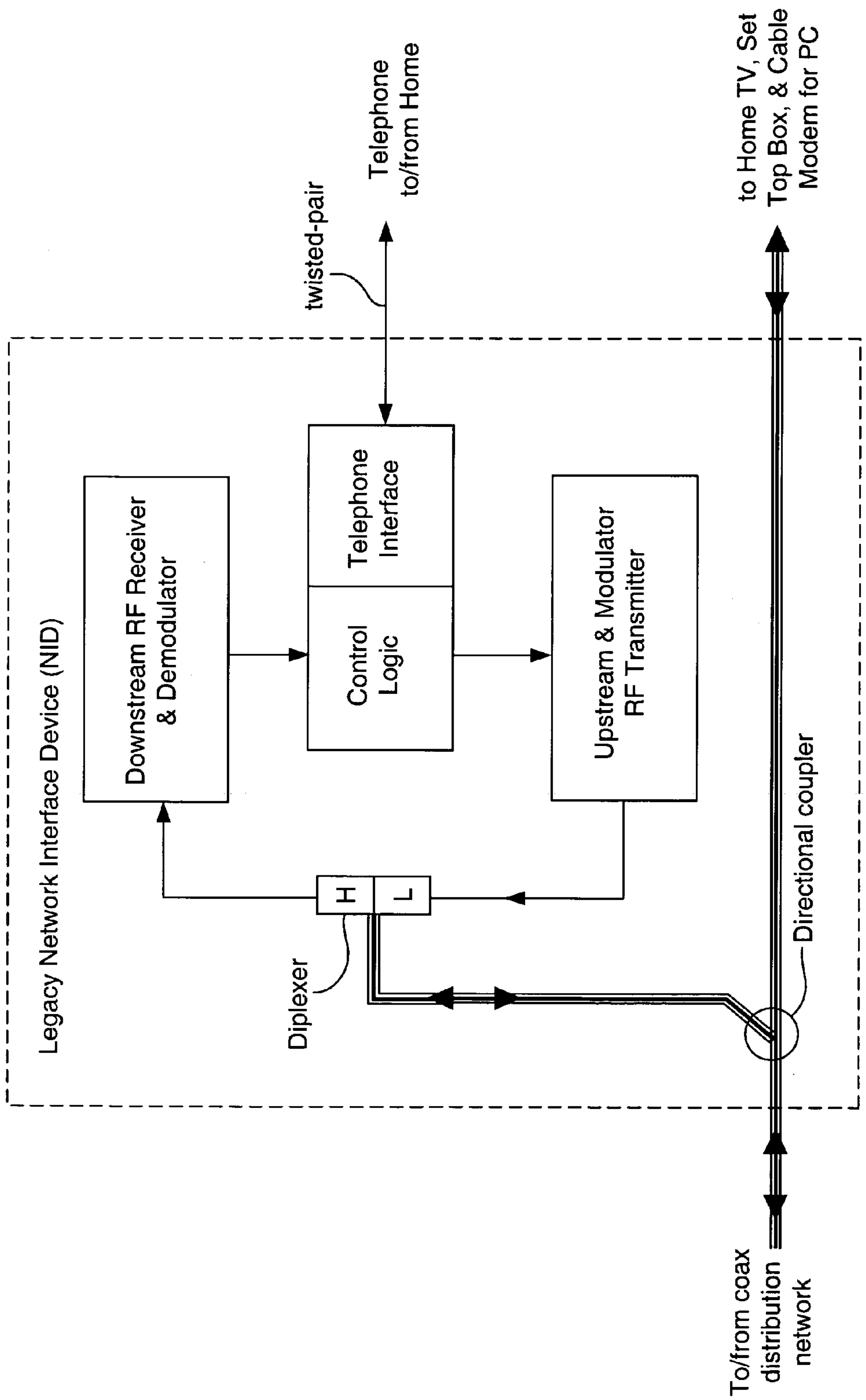
Figure 2A:
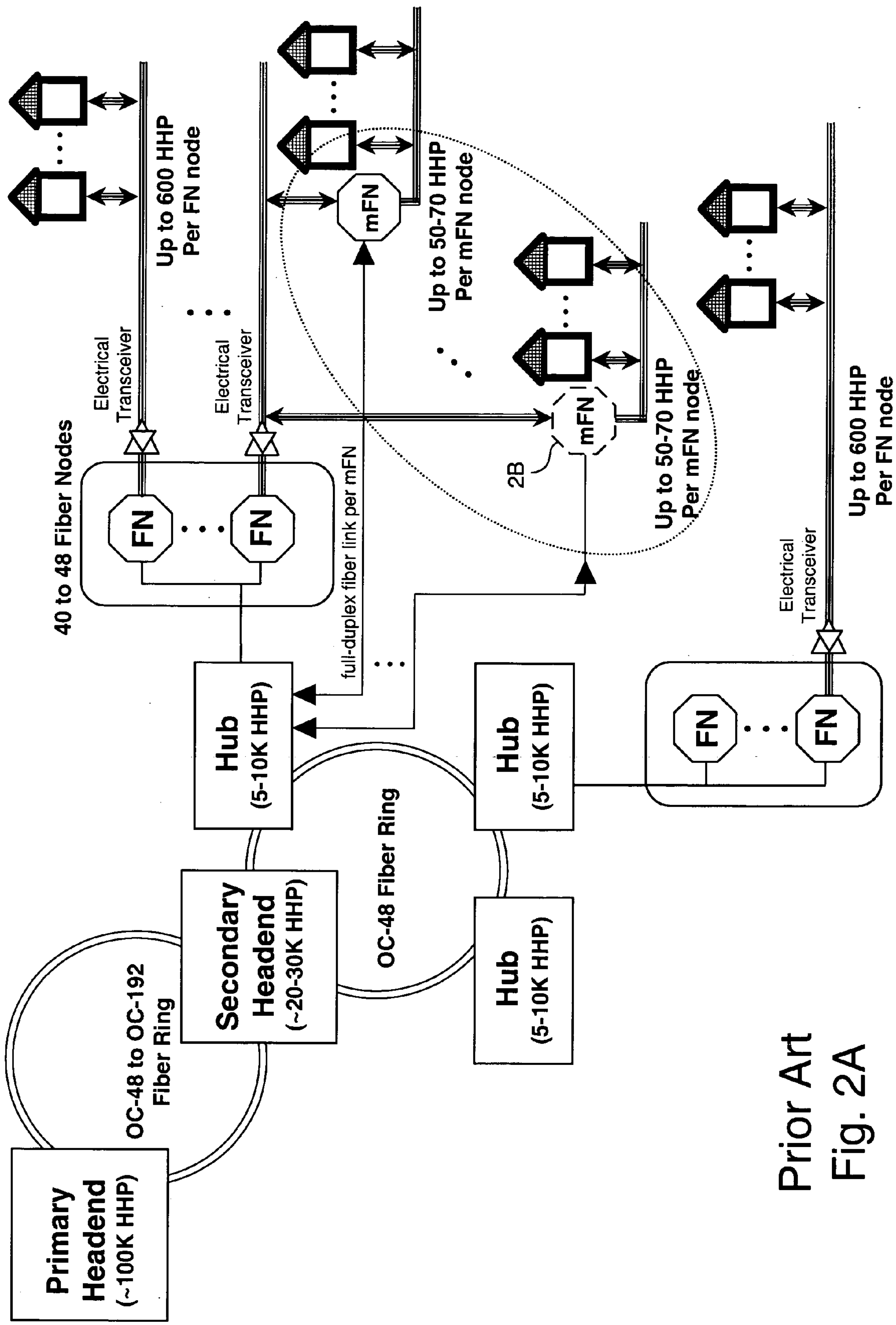
FIGS. 2A and 2B illustrate a prior-art HFC cable system having a packet fiber overlay using mini-FiberNodes (mFNs).
Figure 2B:
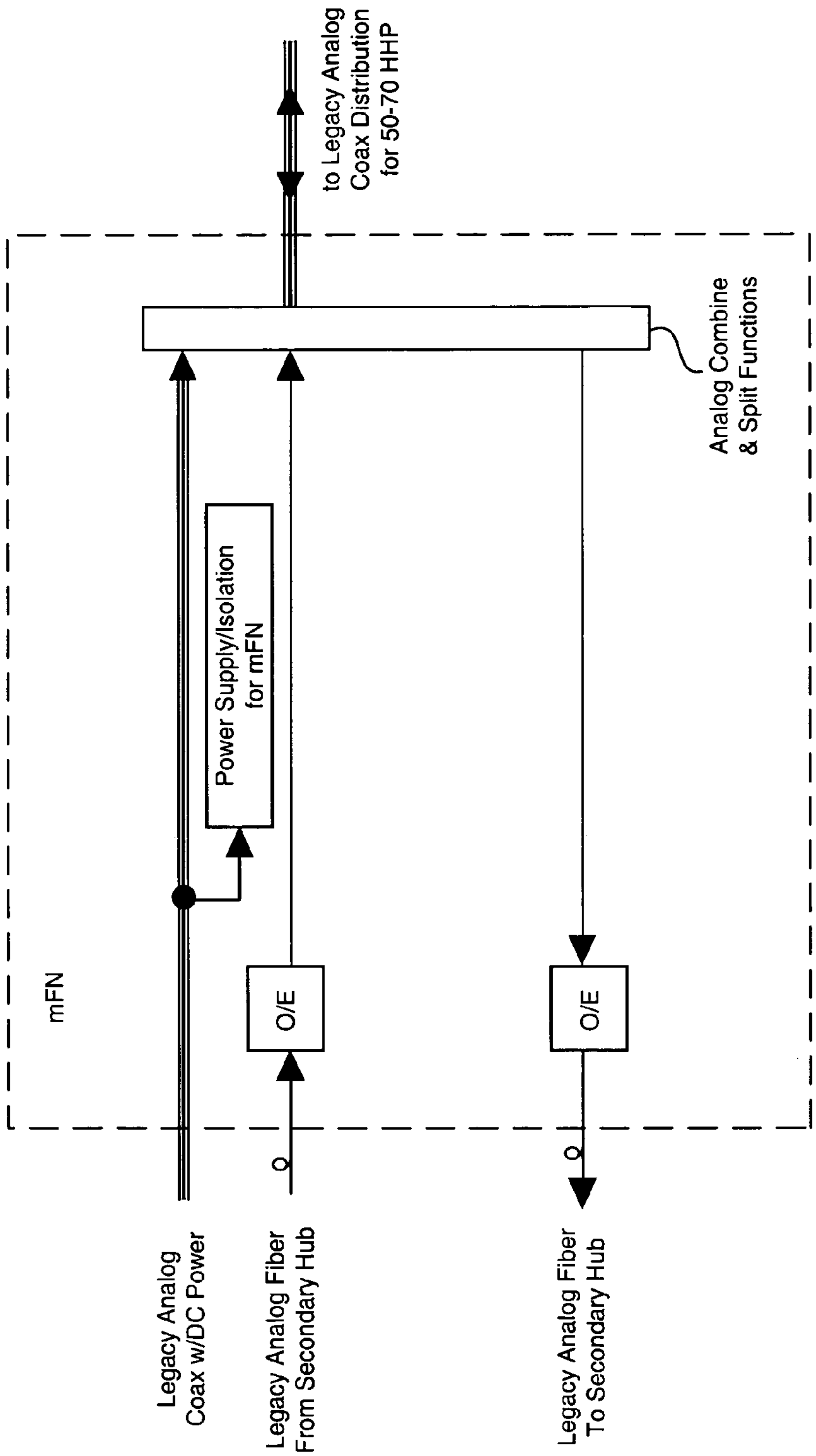

The present invention provides method and apparatus for tunneling (transparently transmitting) over a packet network, from a source to a destination, the spectrum of one or more bandpass channels individually selected from a larger spectrum at the source. Each channel is selected, translated to baseband (using sampling techniques), digitized, framed, merged with other digital services, transmitted (along with associated attribute information) using packet techniques, and later reconstructed. The present invention provides a selective and efficient use of available bandwidth, in that it is not necessary to transmit the entire spectrum, when only one or few portions of the spectrum are desired. This in turn, reduces bandwidth requirements all along the transmission path and at the source and destination. The reduced bandwidth requirements have associated reductions in power and costs.

Systems that utilize the present invention are also an optimized solution to integrating legacy or proprietary encoding and modulation schemes into systems not previously contemplated. In such situations, the present invention avoids the need to locally decode the particular encoded spectra before transmission across the network, or to transmit the entire local spectrum across the network. This is particularly advantageous when it is not practical or possible to locally decode a particular channel's spectra within a larger local spectrum due to technical, financial, legal, or other restrictions. Instead of local decoding, the present invention transmits a digitized version of just the desired encoded spectra across a packet network to a remote site where it is practical or possible to perform the decoding.

In a particular HFC application of the foregoing, the present invention enables legacy telephone encoded spectra at an FN or mFN to be digitized, framed, and combined (in the FN or mFN) with other services for packet-based transmission to a PH (or other processing center). Example network services compatible with and directly or indirectly supported by the present invention include DOCSIS cable modem (CM) services, VoIP (including compliance with the PacketCable standard) as well as legacy HFC telephony services, NVOD, VOD, compliance with OpenCable standards, in addition to broadcast analog and digital video. At the PH the legacy telephone encoded spectra is reconstructed. The encoded spectra may be then be decoding using otherwise legacy methods.

The present invention is also particularly advantageous in the above application due to the power savings associated with only transmitting desired bandpass channels and not the entire local spectrum. If the entire local spectrum is transmitted, all aspects of the end-to-end communications path must be scaled up, even though only a small fraction of the entire local spectrum is actually desired.

More generally, the present invention provides significant savings in power, bandwidth, and cost when one or a few minor bandpass channels are desired to be transmitted across a network. Viewed differently, the present invention provides greater functional density, making it feasible to combine multiple diverse streams. Thus the present invention enables multiple communication channels, unrelated in function or frequency, to be efficiently combined and sent over a network.

Systems in accordance with the present invention may make use of a Channel Table MIB that permits the headend to easily remotely configure the channel selection at the mFN, and set up desired channel characteristics. The remote channel configuration feature can also be used manually or under programmed control to permit the headend to perform remote spectrum sampling at the mFN, again via DSP-based translation and sampling, packet-based transmission, and subsequent reconstruction of the original spectra. Such remote sampling has a number of broad applications beyond those previously discussed, including signal monitoring, end-to-end Frequency Division Multiplexing (FDM), telemetry, and remote status monitoring.

DETAILED DESCRIPTION

System Overview

Figure 5:
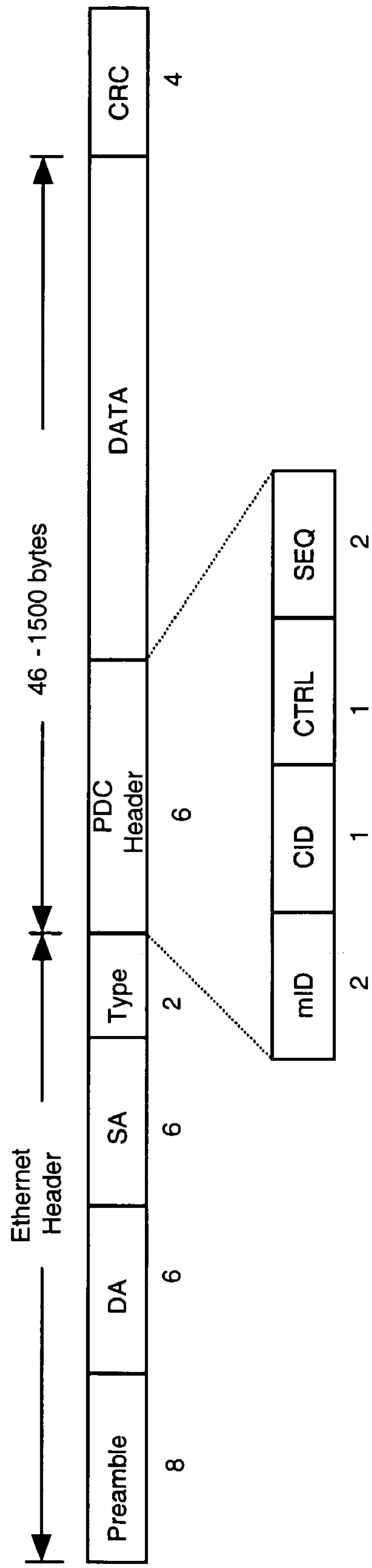
FIG. 5 illustrates the layer 2 encapsulation of digitized return channel data.
Figure 6:
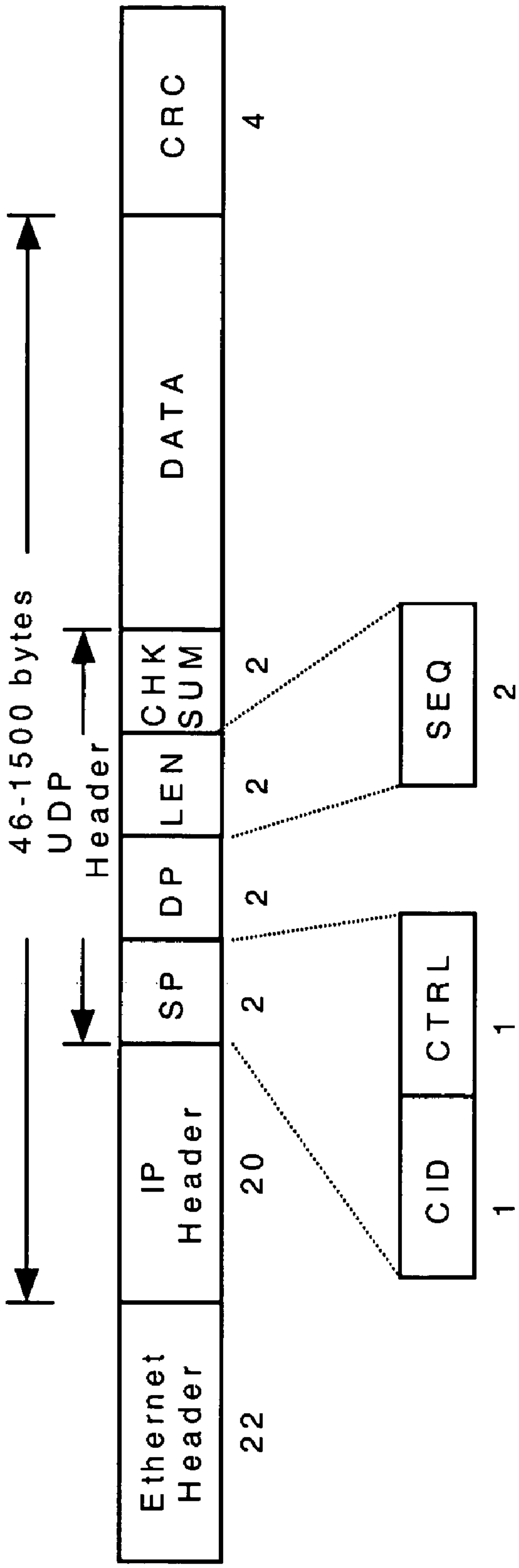
FIG. 6 illustrates the layer 3 encapsulation of digitized return channel data.
Figure 7A:
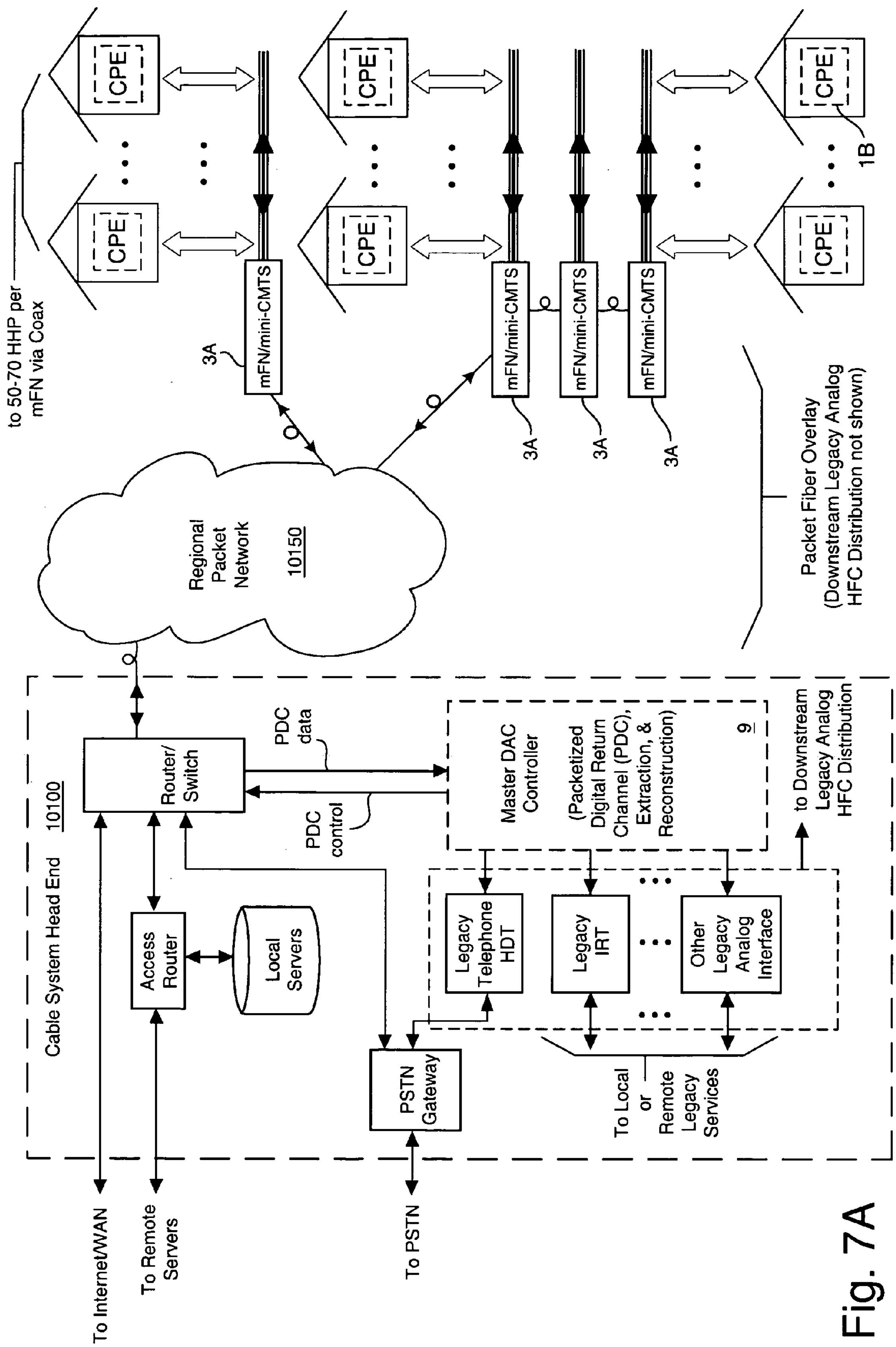
FIGS. 7A and 7B illustrate the system environment for an HFC cable system having a packet fiber overlay using mFN/mini-CMTSs, in accordance with the present invention.
Figure 7B:
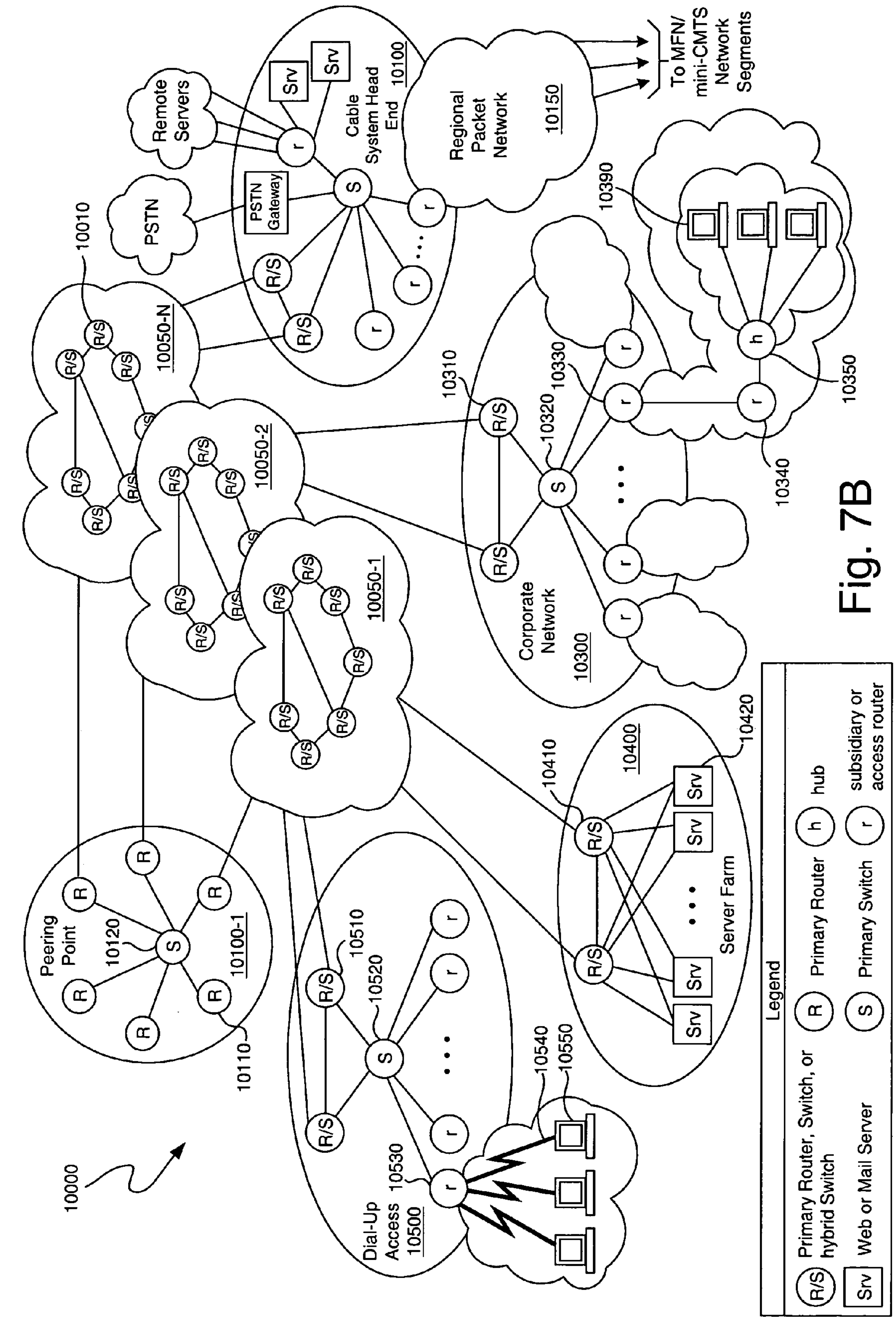
Figure 8:
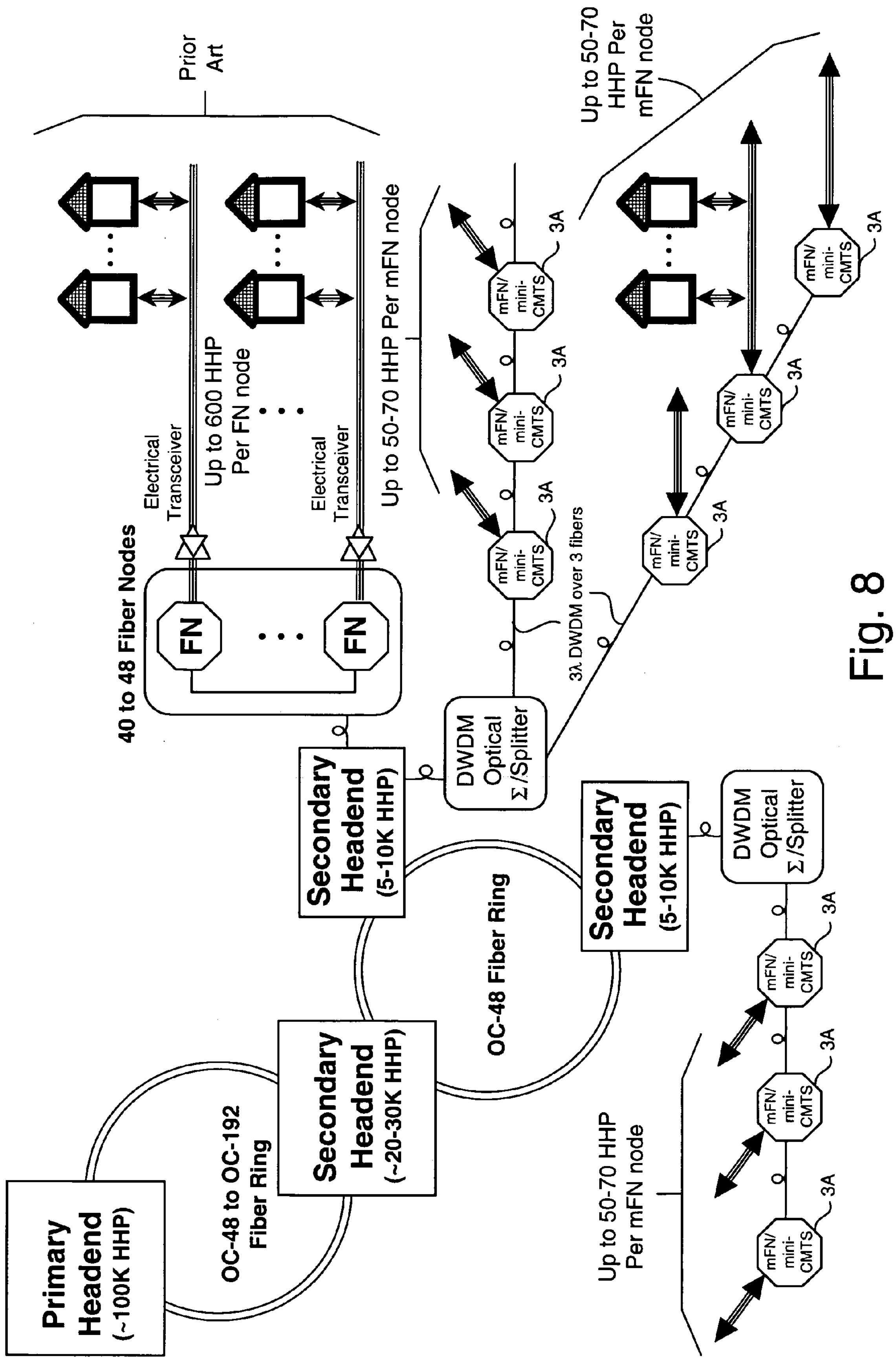
FIG. 8 illustrates an alternate embodiment for an HFC cable system having a packet fiber overlay using mFN/mini-CMTSs, in accordance with the present invention.

FIGS. 3A through 3D illustrate what the applicant refers to as an mFN/mini-CMTS (or simply a mini-CMTS), in accordance with the present invention. FIGS. 4A through 4E illustrate conceptually the process of digitizing a legacy upstream channel. FIG. 5 illustrates the layer 2 encapsulation of digitized return channel data. FIG. 6 illustrates the layer 3 encapsulation of digitized return channel data. As shown in FIG. 7A, FIG. 7B, and FIG. 8, the mini-CMTS interfaces with a Secondary Hub (SH) via packet signaling over fiber, and with 50–70 residential subscribers (households passed, HHP) via coaxial RF interface (RF cable). FIGS. 9 through 16 provide additional detail of various portions of the mini-CMTS.

In a preferred embodiment, 100 Mbps Ethernet is used over separate upstream and downstream fibers coupling the Head End (or SH) to each of up to 8 daisy-channed mFN/mini-CMTSs via respective SONET/DWDM Add/Drop Multiplexers. The preferred embodiment incorporates two downstream (DS) and four upstream (US) channels. Two of the US channels are fully DOCSIS compliant and the two other channels support legacy (proprietary) channels. Clearly, as capacity requirements dictate, embodiments having higher rate packet interfaces and additional US and DS channels are readily extrapolated from the preferred embodiment. The mini-CMTS is compatible with and directly or indirectly supports analog and digital modulated TV signals, DOCSIS cable modem services, VoIP (based on Packet- Cable or other standards), compliance with OpenCable standards, legacy telephony and set top boxes.

The downstream data received from a regional packet network (or other WAN) via 100 Mbps Ethernet protocol is presented via the mini-CMTS's MAC to the downstream modulator formatted in 188 bytes MPEG frames which are, in turn, coded and modulated into a 44 MHz IF signal.

The analog return spectrum (5–42 MHz) is digitized and selected upstream DOCSIS channels are demodulated and the data extracted. The packet are delivered by the DOCSIS MAC to the Ethernet interface and then transferred optically to the Head End (or SH) via the packet network.

Similarly, from the same digitized analog return spectrum (5–42 MHz) legacy channels are selected and packetized into Ethernet frames using either a layer 2 or layer 3 protocol. These frames are forwarded to the cable Head End by commercially available switches. At the Head End, a Master DAC Controller extracts the bit streams from the Ethernet frames and recovers the analog channels.

Mini-CMTS

Figure 3A:
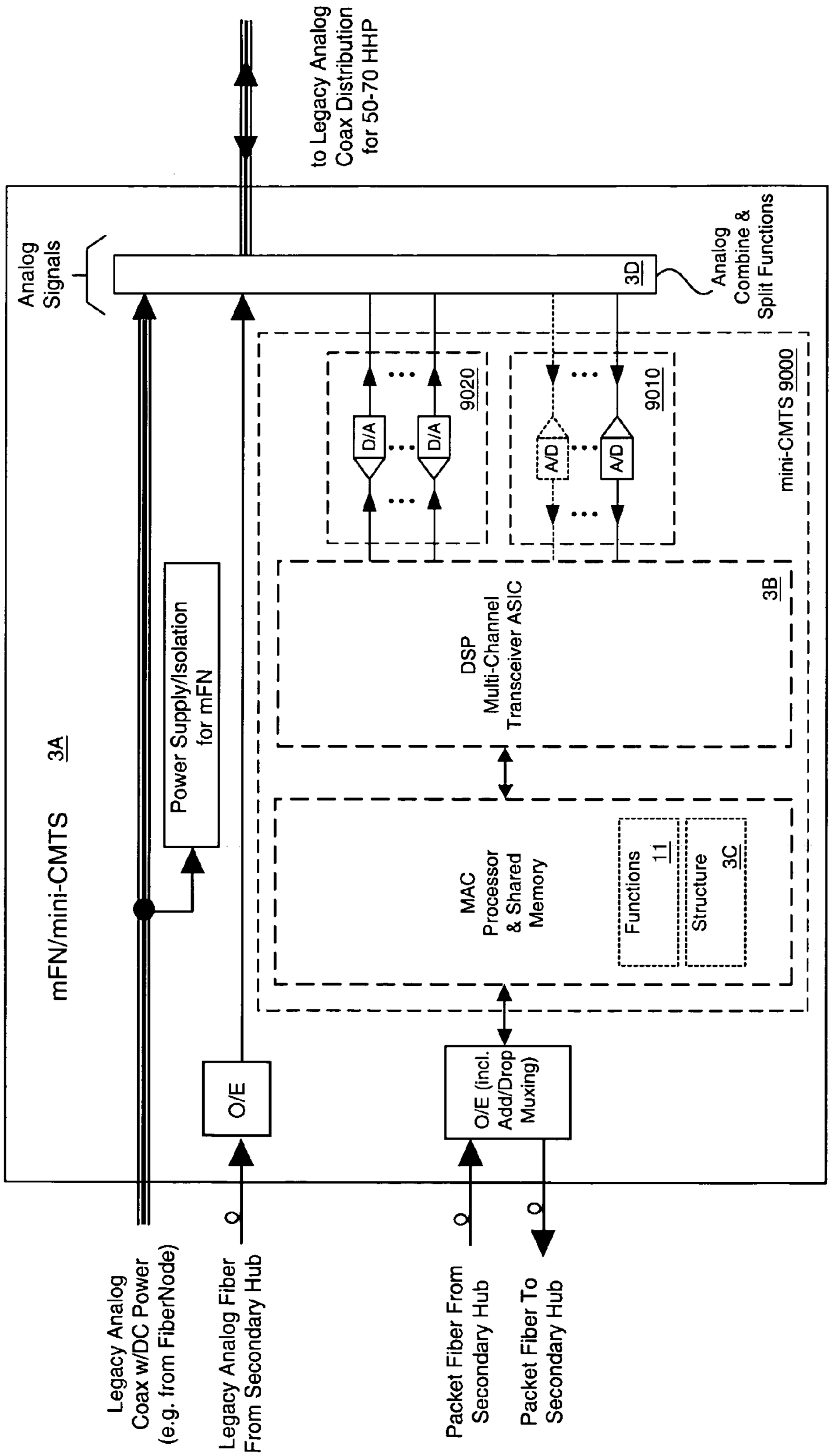
FIGS. 3A through 3D illustrate a mFN/mini-CMTS, in accordance with the present invention.
Figure 3B:
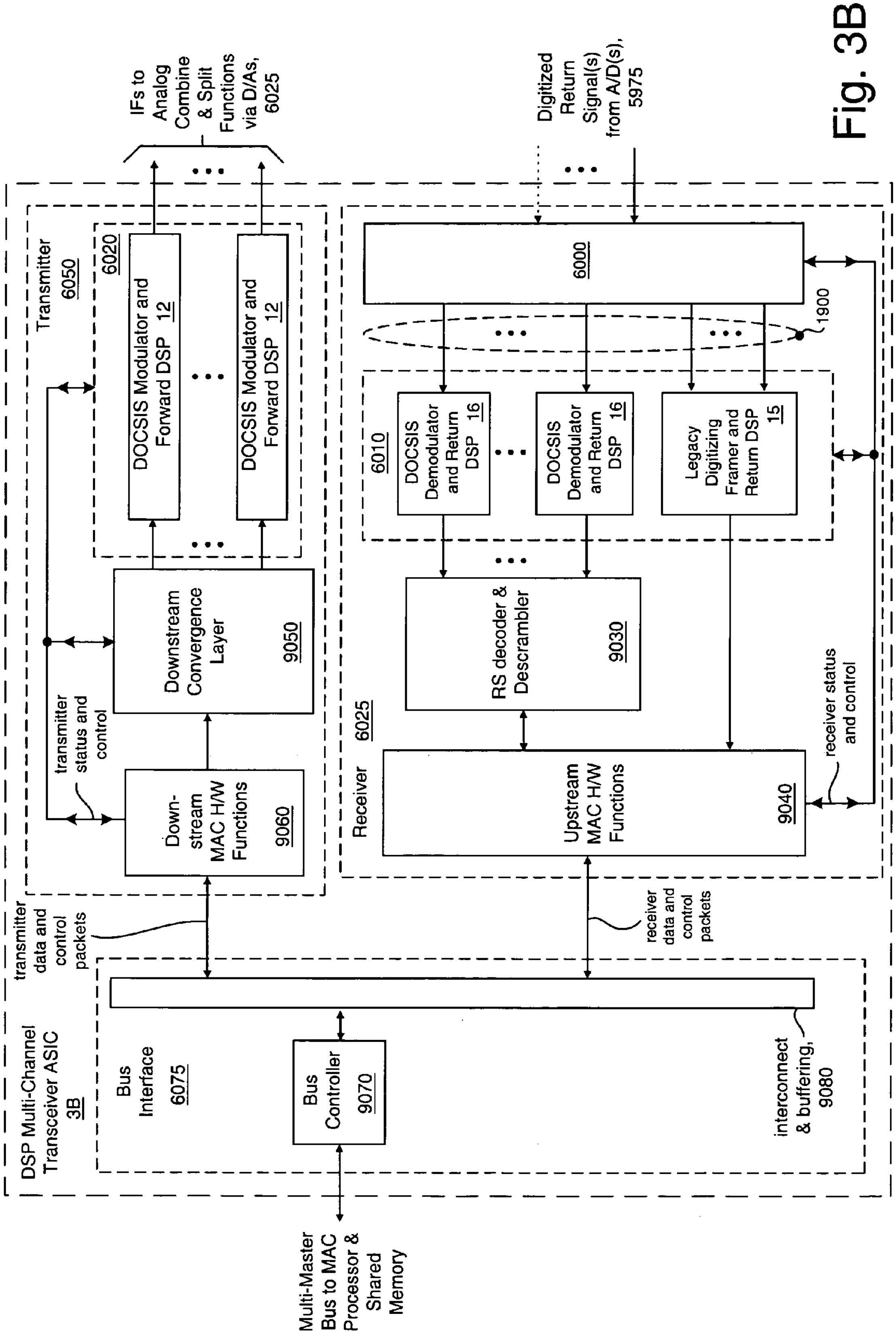
Figure 3C:
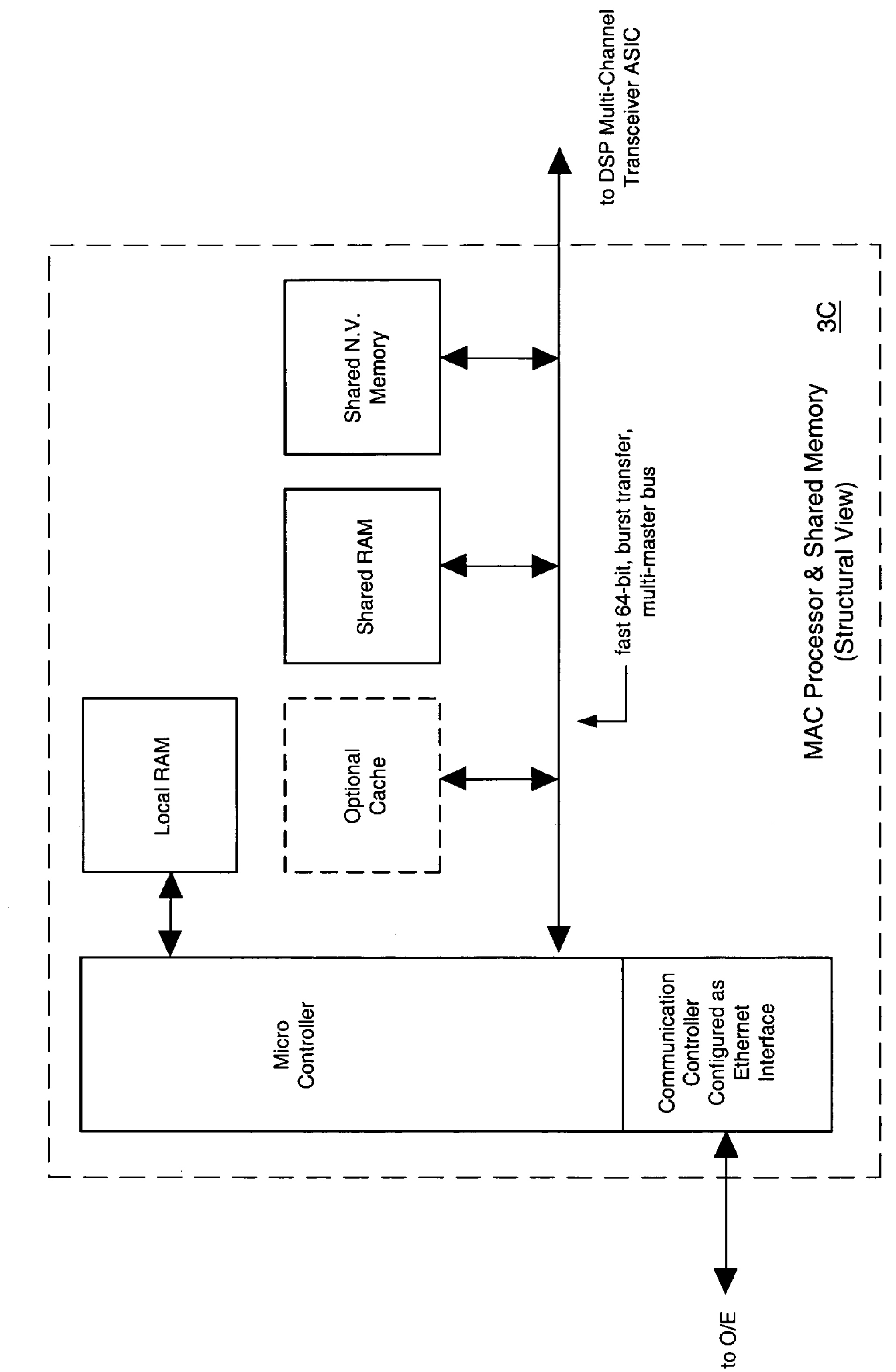

FIG. 3A is a top-level view of the mFN/mini-CMTS. The mFN/mini-CMTS includes an optical add/drop multiplexer, power extraction and distribution functions, D/As 9020, A/Ds 9010, and Analog Combine and Split Functions 3D, DSP Multi-Channel Transceiver ASIC 3B, and MAC Processor and Shared Memory. The mini-CMTS is implemented on a PCB assembly that includes the DSP Multi-Channel Transceiver ASIC (also referred to as the HFC-ASIC), a Media Access Control (MAC) processor and shared memory block, a plurality of D/As, and one or more A/Ds. FIG. 3B provides additional detail of the DSP Multi-Channel Transceiver ASIC of FIG. 3A. FIG. 3C provides detail of the underlying structure for the Mac processor and shared memory of FIG. 3A. The MAC structure includes a micro-controller, a communications controller configured as an Ethernet interface, RAM, non-volatile memory, and a multi-master bus.

Overview of the Analog Combine and Split Functions

Over the coaxial RF interface, the mini-CMTS supports DOCSIS MAC/PHY services over a number of upstream and downstream channels. The 5–42 MHz upstream spectrum from the legacy analog distribution generally includes both DOCSIS channels and legacy channels. This upstream is isolated by appropriate filtering and provided to one or more digitization paths (the optional additional paths being represented via dashed lines in FIG. 3A and FIG. 3D), each digitization path including AGC and A/D circuitry.

Figure 3D:
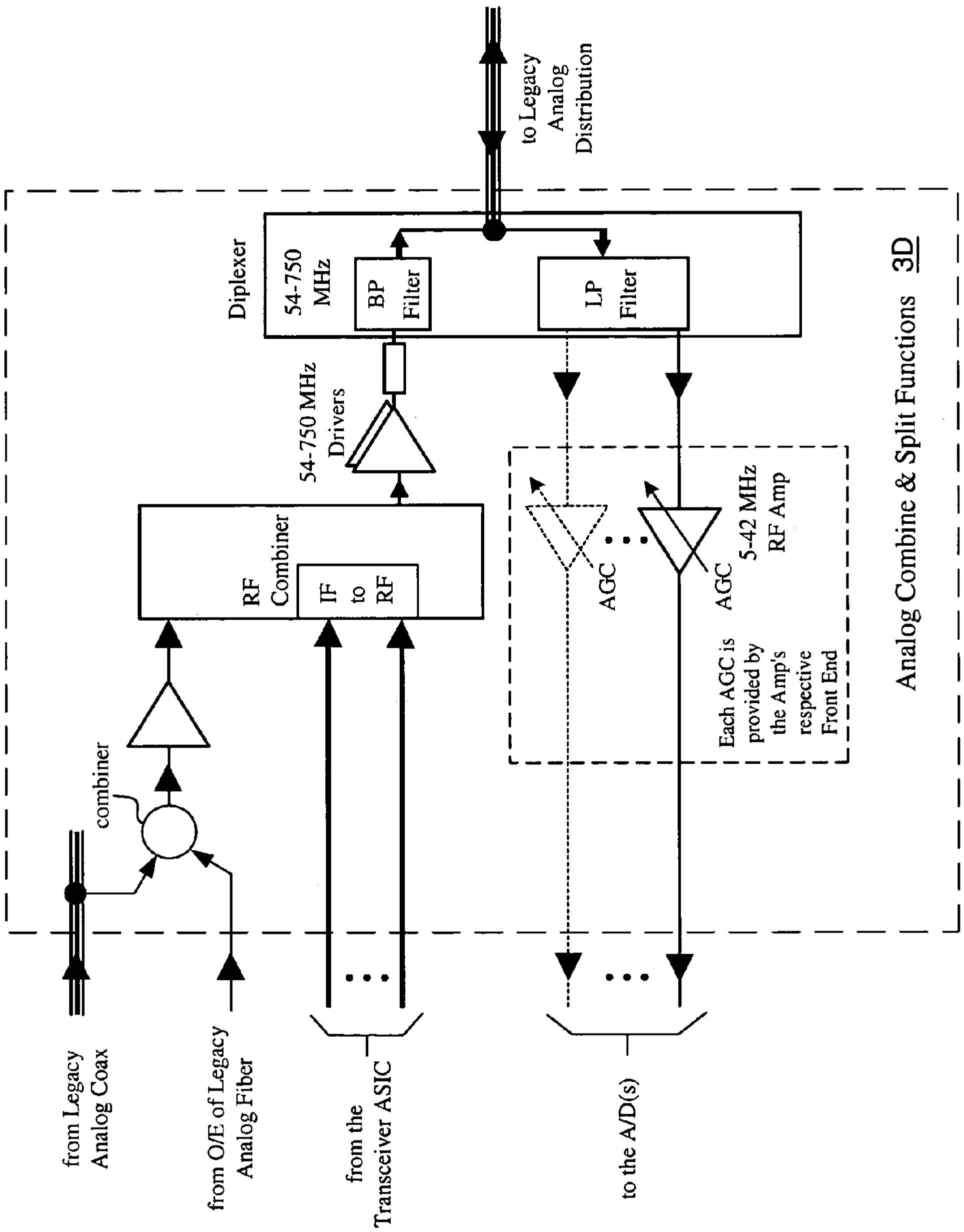

FIG. 3D provides additional detail of the Analog Combine and Split Functions of FIG. 3A. In an illustrative embodiment, IF-to-RF upconverters are provided for two digital downstream DOCSIS channels. Optionally, upconverters may be added for one or more legacy broadcast channels. Combiners stack the upconverted channels from the DSP Multi-Channel Transceiver ASIC along with downstream channels originating from the Legacy Analog Coax and Legacy Analog Fiber. Clearly, the upconverters and combiners must meet the constraints associated with mFN usage. In an illustrative embodiment the IF-to-RF upconverters are addressable via an integral I2C industry standard bus and meet the specifications provided in Table 1 through Table 3, below.

TABLE 1

IF-to-RF Physical Requirements

| Parameter | Value(s) |
|---|---|
| Power Supplies | +5 V, +12 V |
| Ambient Temp. | −40 C. to +85 C. |

TABLE 2

IF-to-RF IF Input Requirements

| Parameter | Value(s) |
|---|---|
| IF frequency | 40 MHz |
| Bandwidth | 6 MHz |
| Input level | +25 to +35 dBmV |
| IF attenuator step-size | 1 dB (0.1 dB preferred) |
| AGC | enable/disable |

TABLE 3

IF-to-RF RF Output Requirements

| Parameter | Value(s) |
|---|---|
| Frequency | 550–870 MHz |
| Frequency step | 50 KHz or better |
| Frequency accuracy | 2 ppm |
| Gain control | +45~+61 dBmV |
| Spurious emissions, 50–900 MHz | −60 dBc |
| Modulated Adj. Noise, 3.75–9 MHz | <−62 dBc |
| Carrier mute | automatic upon frequency change |

Overview of the DSP Multi-Channel Transceiver ASIC

In a preferred embodiment, the ASIC 3B includes bus interface 6075, transmitter 6050, and receiver 6025. The transmitter and receiver respectively include modulators and demodulators designed to meet the DOCSIS specifications. The receiver also includes processing for legacy return channels.

The bus interface 6075 provides access to the multi-master bus and thus couples both the transmitter and receiver to the MAC processor and shared memory 11. In the illustrative embodiment of FIG. 3B, a single bus controller is shared by the transmitter and receiver. The transmitter and receiver are shown coupled to the bus controller via interconnect and buffering 9080. Those skilled in the art will recognize that other methods of coupling to the multi-master bus are available and equivalent within the overall context of the present invention.

The transmitter includes a number of function blocks common across all channels as well as channel-specific blocks. The common functions include downstream MAC H/W functions 9060 (i.e., those DS MAC functions implemented in hardware) and downstream convergence layer functions 9050. Multi-channel modulator block 6020 includes a DOCSIS modulator and forward DSP block 12 for each transmit channel. The transmitter receives an MPEG-compatible stream for each channel (two in an illustrative implementation) and delivers a corresponding downstream IF output signal at 44 MHz.

Figure 14:
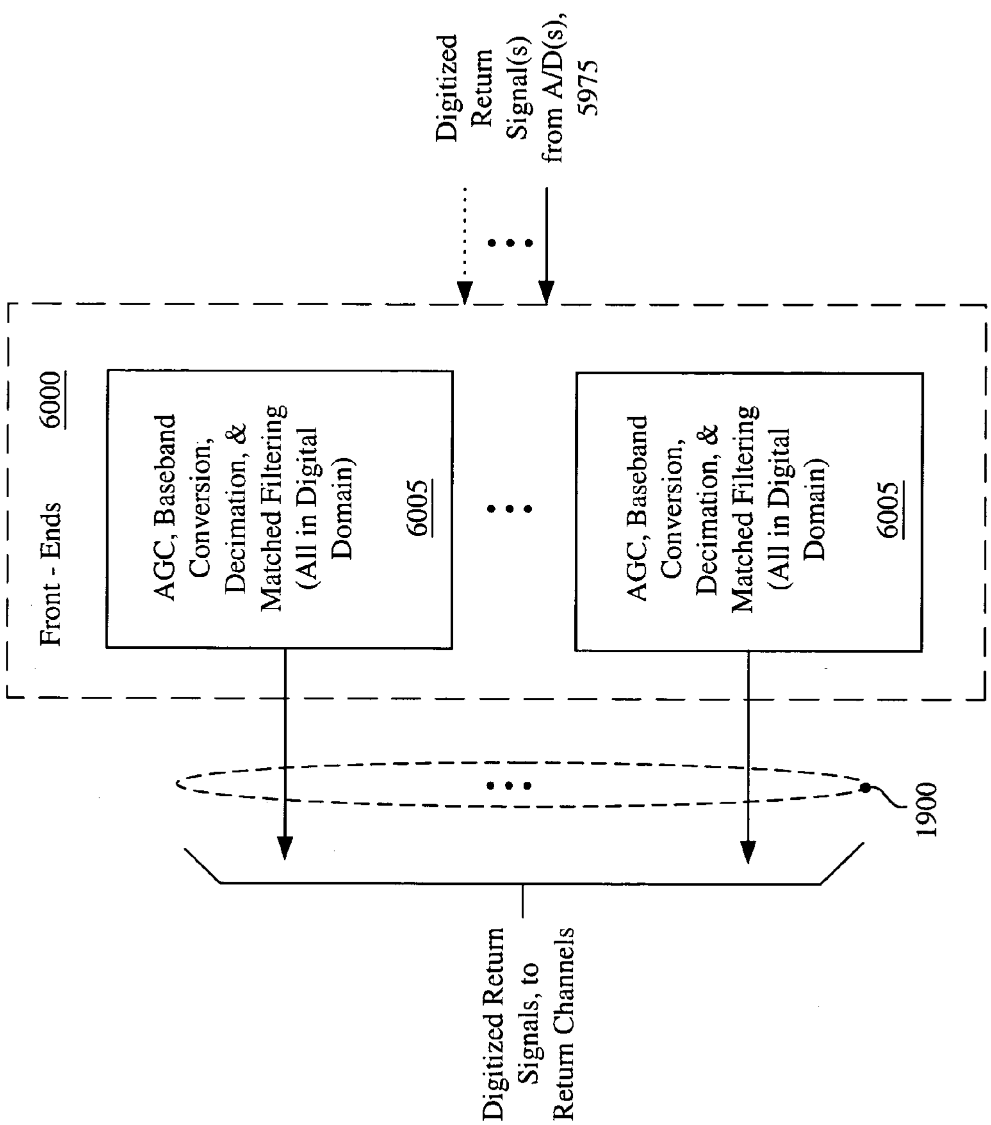
FIG. 14 provides internal detail of the front-end(s) 6000 of FIG. 3B.
Figure 15:
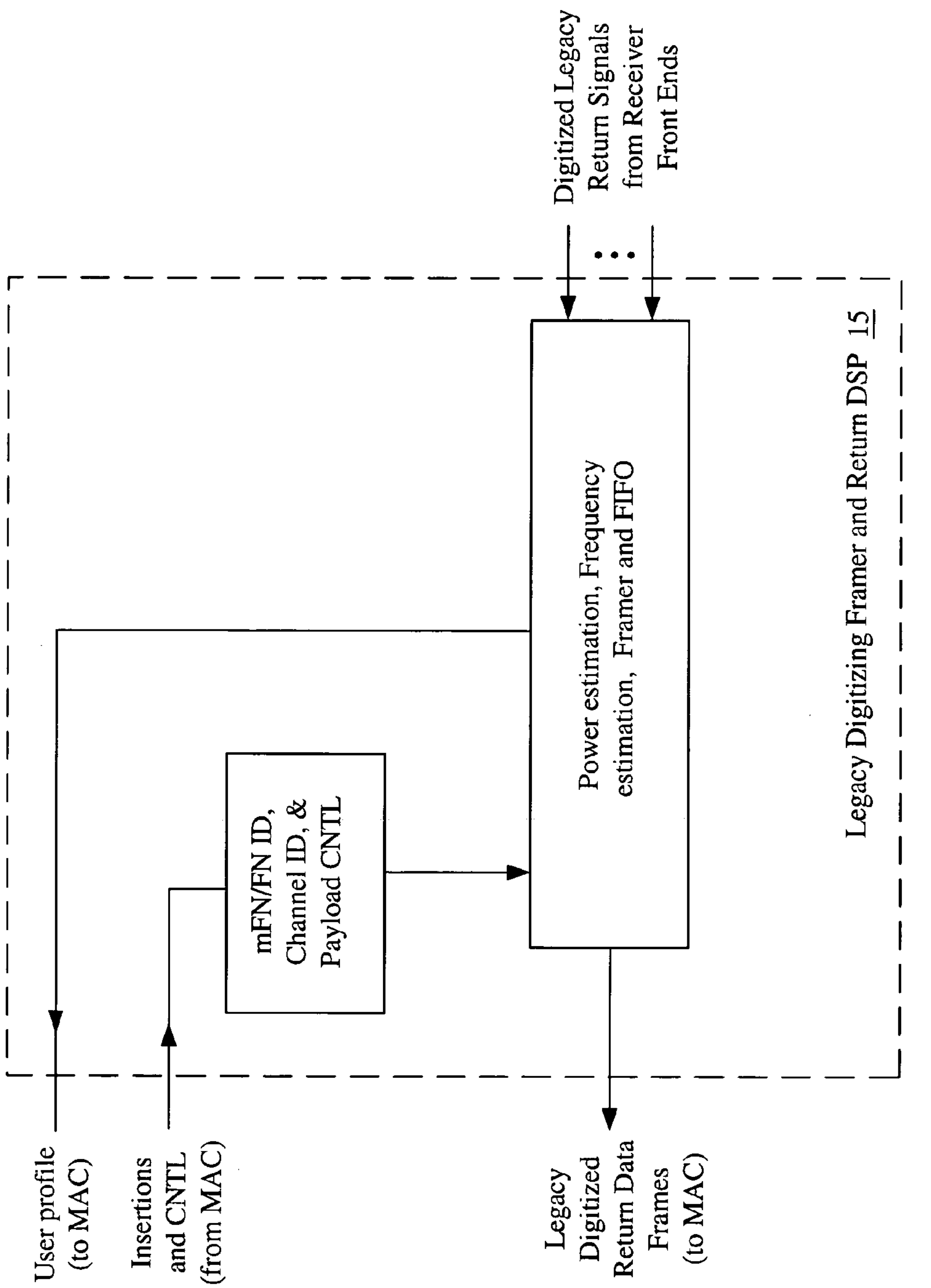
FIG. 15 provides internal detail of the Legacy Digitizing Framer And Return DSP 15 of FIG. 3B.

The receiver includes a front-end 6000, channel-specific processing 6010, a RS decoder and Descrambler 9030, and Upstream MAC H/W functions 9040. FIG. 14 provides additional detail of Front-end 6000. Front-end 6000 includes separate front-ends 6005 for each channel. Separate digitized signal outputs are provided for each channel; collectively these outputs comprise signals 1900. In a preferred embodiment, at least some channel outputs from 6000 include I and Q quadrature pairs for a given channel. At least one digitized return signal is provided to front-end 6000. In a preferred embodiment, each of a plurality of provided digitized return signals, corresponding to respective external A/Ds and associated analog input circuits, is selectively coupled to one or more of the individual front-ends 6005.

Figure 16:
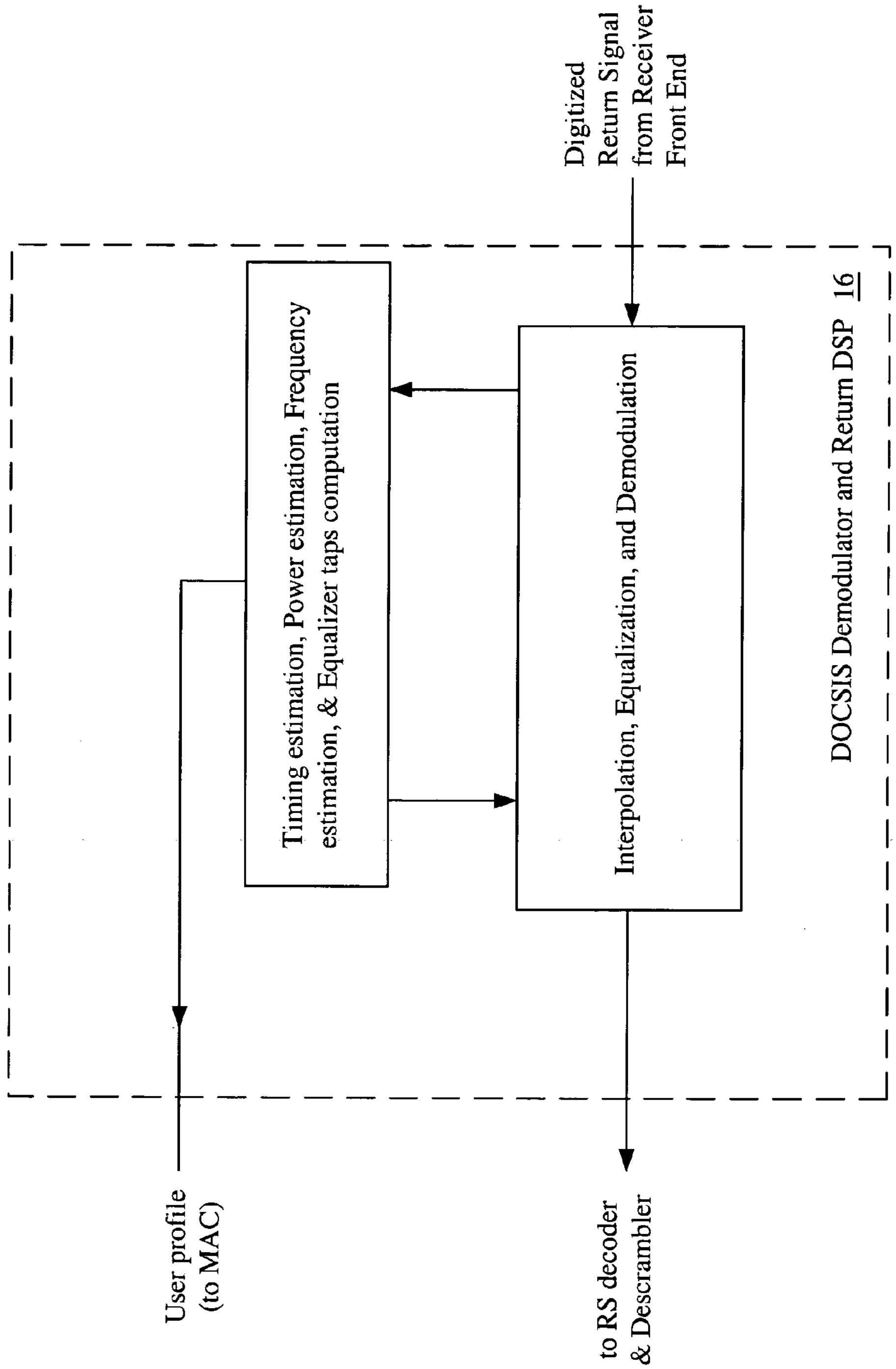
FIG. 16 illustrates the DOCSIS-specific return receiver functions implemented on a per-channel basis.

The front-end channel outputs are provided to the channel-specific processing within block 6010. These channel outputs generally correspond to both DOCSIS and legacy return channels. Each DOCSIS channel (2 in a preferred embodiment) output from the front-end is processed in a DOCSIS Demodulator and Return DSP block 16. As depicted in FIG. 16, this block provides demodulation of the TDMA upstream transmissions originating from Cable Modems or Set Top boxes. The DOCSIS Demodulator and Return DSP logic 16 provides the MAC layer with user profile information, including timing, power, and frequency estimation data. The demodulator outputs of each DOCSIS Demodulator and Return DSP block 16 are collectively provided to the RS Decoder and Descrambler 9030, the output of which is coupled to the Upstream MAC H/W Functions 9040. The legacy channels (2 in a preferred embodiment) output by the front-end are processed in Legacy Digitizing Framer and Return DSP block 15, the output of which is also coupled to the Upstream MAC H/W Functions 9040.

Details of the ASIC Transmitter Functions

The Downstream Transmission Convergence (DTC) Layer block 9050 provides an opportunity to transmit additional services, such as digital video, over the physical-layer bitstream. This function provides at its output a continuous series of 188-byte MPEG packets [ITU-T H.222.0], each constituting of a 4-byte header followed by 184 bytes of payload. The header identifies the payload as belonging to the data-over-cable MAC that can be interleaved with other MPEG data flows providing different services. Note that a DOC MAC frame may span over multiple MPEG packets and an MPEG packet may contain multiple DOC MAC frames.

Figure 12:
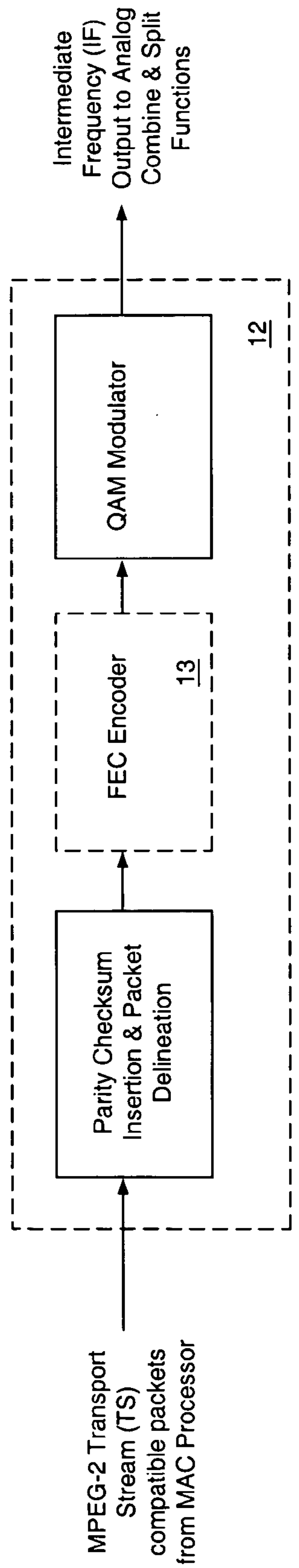
FIG. 12 provides internal detail of the downstream transmitter functions implemented on a per-channel basis.

The DOCSIS Modulator and Forward DSP block 12 implements the Physical Media Dependent (PMD) functions described in the [ITU J.83-B] Recommendations with an exception for the interleaving function that must conform only with a subset of the "Level 2" of the ITU recommendation. FIG. 12 provides internal detail of these functions. The first sub-block monitors the MPEG-2 Transport Stream compatible packets and inserts a parity checksum for detected sync bytes (1st byte having a value of 47 HEX) to provide error detection capability and packet delineation.

Forward Error Correction

Figure 13:
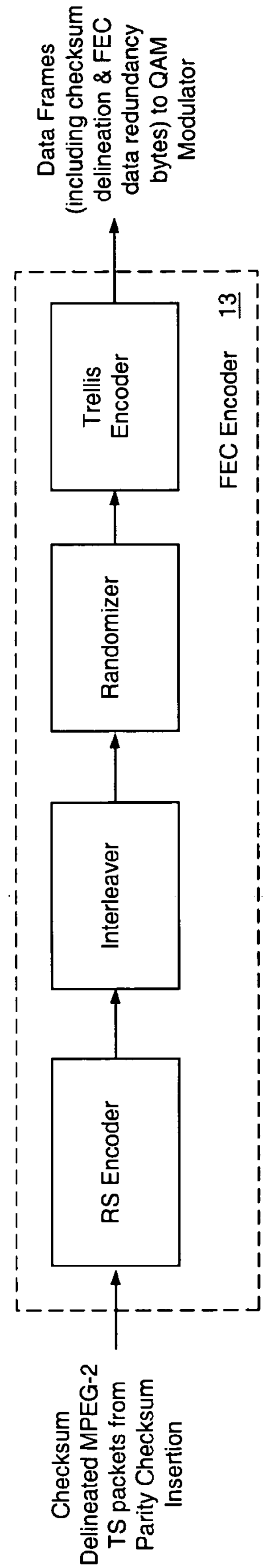
FIG. 13 illustrates sub-functions of the FEC block of FIG. 12.

FIG. 13 illustrates the sub-functions of the Forward Error Correction (FEC) block of FIG. 12. The Reed-Solomon encoder implements an RS(128,122,3) code over GF(128). It provides encoding to correct up to 3 RS symbol (7-bit size) per RS block of 128 symbols.

The next FEC sub-block is a convolutional type interleaver supporting variable depth I=128, 64, 32, 16, and 8. It evenly disperses the symbols, protecting against a burst of symbol errors from being sent to the RS decoder at the receiver side. A frame synchronization sequence trailer delineates the FEC frame in order to provide synchronization for RS decoding, de-interleaving as well as de-randomizing at the receiver side. Four data bits are transmitted during the FEC frame sync interval in order to convey the interleaving parameters to the receiver. Note that the sync trailer depends on the modulation format.

Next a synchronous randomizer provides for even distribution of the symbols in the constellation. The randomizer is initialized during the FEC frame trailer and enabled at the first symbol after the trailer; thus the trailer is not randomized.

The Trellis Encoder uses an overall code rate of 14/15 with 64-QAM and 19/20 with 256-QAM. It is based on a 1/2-rate binary convolutional encoder punctured to 4/5 rate. In 64-QAM mode, 28 bits are collected in block, coded and mapped to 5x 64-QAM symbols. In 256-QAM mode, 38 bits feed the trellis encoder and deliver 40 bits that are mapped to 5x 256-QAM symbols. Note that the trellis-coding scheme used is 90° (90-degree) rotationally invariant to avoid FEC resynchronization in the receiver after carrier phase slips.

QAM Modulator

The 64- or 256-QAM symbols at the trellis encoder output of the FEC Encoder are pulse shaped using square-root raised cosine Nyquist filtering before modulation around a selected RF carrier. The roll-off factor is a=0.18 for 64-QAM and a=0.12 for 256-QAM. The channel spacing (bandwidth) is 6 MHz, which leads to a symbol rate of 5.057 Mbaud with 64-QAM and 5.36 Mbaud with 256-QAM. The RF frequency band is 91 to 857 MHz. In practice, the modulation is first performed using an IF stage with a standard IF frequency at 43.75 MHz (36.15 in Europe), and next the signal is up-converted from IF to RF using an up-converter function.

Overview of DOCSIS Receive Functions

The upstream receiver 6025 incorporates all the upstream functions required to implement the DOCSIS Physical Media Dependent (PMD) sub-layer. The receiver extracts the data packets transmitted by the Cable Modems (CMs) and sends them to the MAC layer. If the concatenation/fragmentation function is used, the data packets delivered by the upstream receiver are fragment payloads of MAC frames. If not, the data packets are full DOC MAC frames. The upstream receiver is a multiple channel burst receiver supporting for each burst: a variable burst length (0–255 minislots), flexible modulation scheme (QPSK, 16-QAM), variable symbol rate (5 values from 160 to 2560 kbaud), variable preamble length and value, variable randomizer seed, and programmable FEC. Each upstream receiver channel is provisioned appropriately for each of these parameters via the management and control functions of the MAC layer. In addition, the upstream receiver integrates channel performance and monitoring function that feeds the MAC layer with all the necessary information for ranging purposes and for channel capacity optimization.

Front-End

The front-end 6000 down-converts each channel signal to baseband, filters the down-converted signal using a matched filter (roll-off factor a=0.25), and performs synchronization in timing and frequency.

Burst Demodulator

Each QPSK or QAM burst modulated channel signal is then demodulated within a respective DOCSIS demodulator and Return DSP block 16 in order to extract the data transmitted within the burst. The demodulator may also equalize the signal before its decision circuit in order to compensate for echoes and narrow-band ingress noise. Gain control and power estimation functions are necessarily provided to insure correct demodulation. Each DOCSIS demodulator and Return DSP block 16 delivers at its output one or more FEC scrambled packets.

Descrambler and FEC Decoder

The operation of RS Decoder and Descrambler block 9030 is now examined. At the beginning of each data burst, the register of the de-scrambler is cleared and the seed value is loaded. The de-scrambler output is combined in a XOR function with the data. Next, the information data is separated into FEC codewords and decoded, where the FEC is an RS (k, n, T) with k=16 to 253, n=k+2T and T=0, 10. T=0 means the FEC is turned off. Note that the last codeword can be shortened and thus, the RS decoder must fill the codeword with the necessary number of zeros before decoding. Finally, the decoded data is fed to the MAC layer.

Performance Monitoring

In a preferred embodiment, the upstream receiver also provides the following per-channel performance information to the MAC layer:

a) Timing estimation;
b) Frequency offset estimation;
c) Power estimation (signal and noise);
d) Pre-equalizer taps estimation;
e) BER estimation (preamble and FEC);
f) Collision indication;
g) Missed acquisition of burst (due collision or noise); and
h) RF Spectrum monitoring.

Legacy Upstream Channel Digitizer Functions

Figures 4A, 4B, 4C, 4D, 4E:
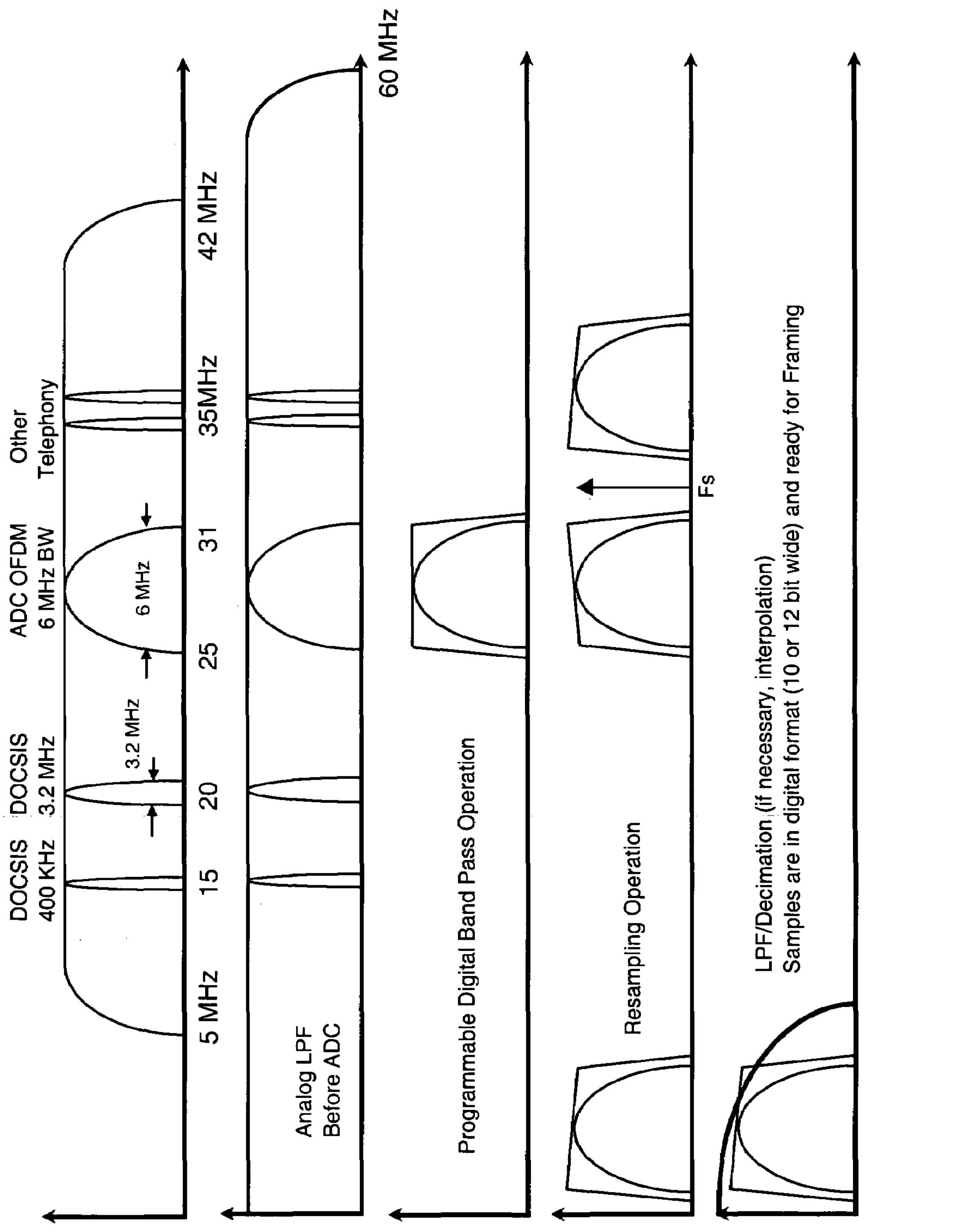
FIGS. 4A through 4E illustrate conceptually the process of digitizing a legacy upstream channel.

FIGS. 4A through 4E illustrate conceptually the process of digitizing a legacy upstream channel. (The understanding of this discussion is facilitated by examination of FIG. 3A, FIG. 3B, FIG. 3D, FIG. 14.) FIG. 4A shows the 5–42 MHz return spectrum, including a desired 6 MHz legacy return channel. FIG. 4B represents a low-pass (anti-alias) filtering operation performed in the analog domain (see also FIG. 3D) to eliminate out of band noise and unwanted signals. Subsequently, one of the provided A/Ds (see reference 9010 in FIG. 3A) digitizes the entire return spectrum in the Nyquist space.

Once digitized, the desired legacy signal needs to be converted to baseband, isolated from other upstream signals, and decimated. FIGS. 4C through 4E illustrate these functions conceptually. FIG. 4C represents a band-pass (channel isolation) operation performed in the digital domain at the provisioned frequency and bandwidth, as directed by the MAC control functions. As illustrated in FIG. 4D, the signal is then resampled, converted to baseband, and decimated by a multistage decimation process. The data is subsequently digitally filtered, as illustrated in FIG. 4E, to eliminate unwanted spectra-replicas. In a preferred embodiment, the digitized legacy signal is baseband converted prior to isolation and decimation. As represented in FIG. 14, these functions are performed for each channel by a respective block 6005, within front-ends 6000.

The digital baseband signal is then sent to the Upstream MAC H/W Function block 9040 via Legacy Digitizing Framer and Return DSP block 15. In the Mac layer the digitzed baseband stream is organized into Ethernet frames. Legacy Digitizing Framer and Return DSP 15 facilitates the framing process, including the identification of each frame by MFN-ID, channel-ID and Payload control (using Source Address, SA; and Destination Address, DA). Legacy Digitizing Framer and Return DSP 15 also provides the MAC layer with user profile information, including power and frequency estimation data.

Figure 9:
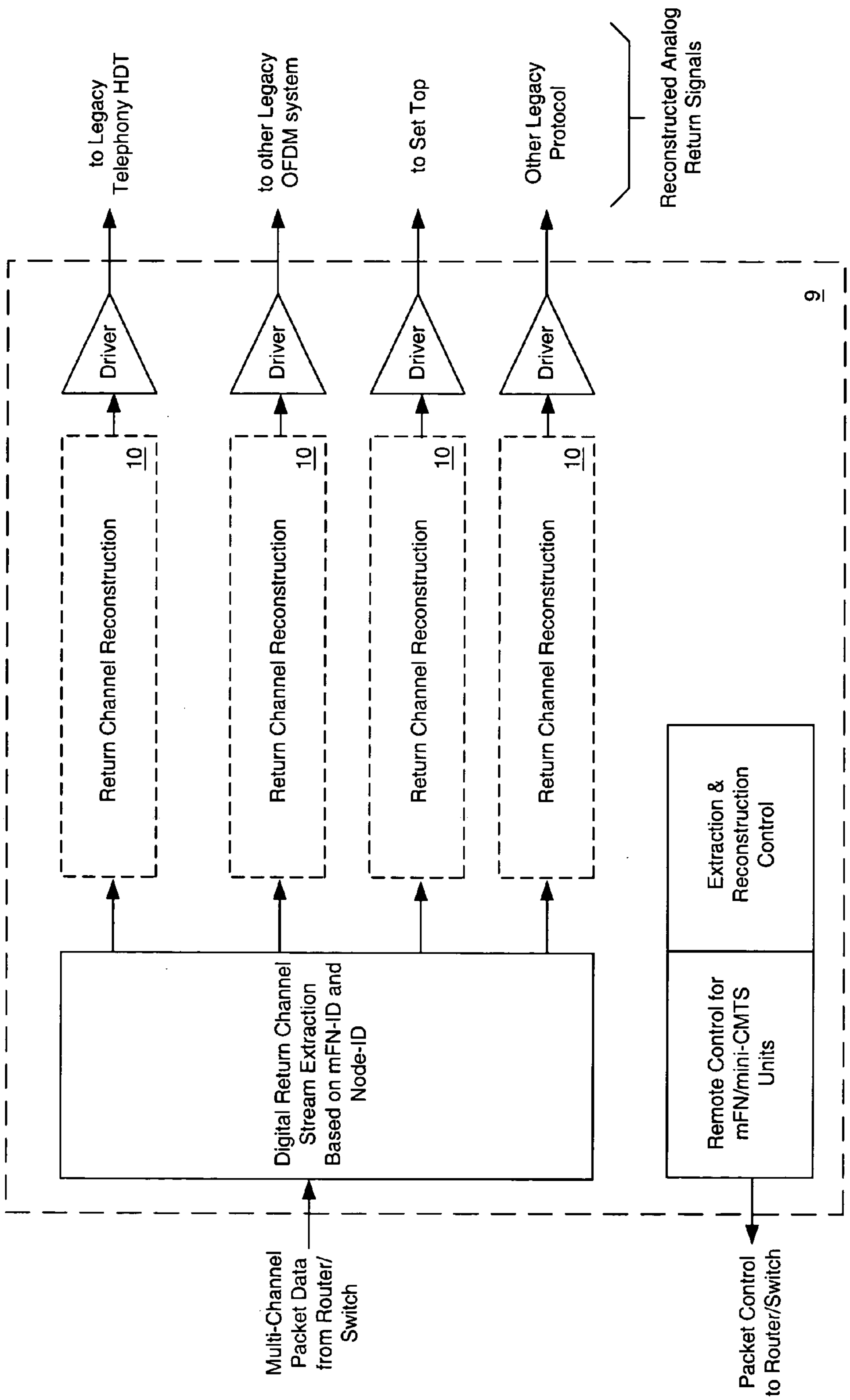
FIG. 9 provides internal detail of the PDC, Extraction, and Reconstruction block of FIG.7A.
Figure 10:
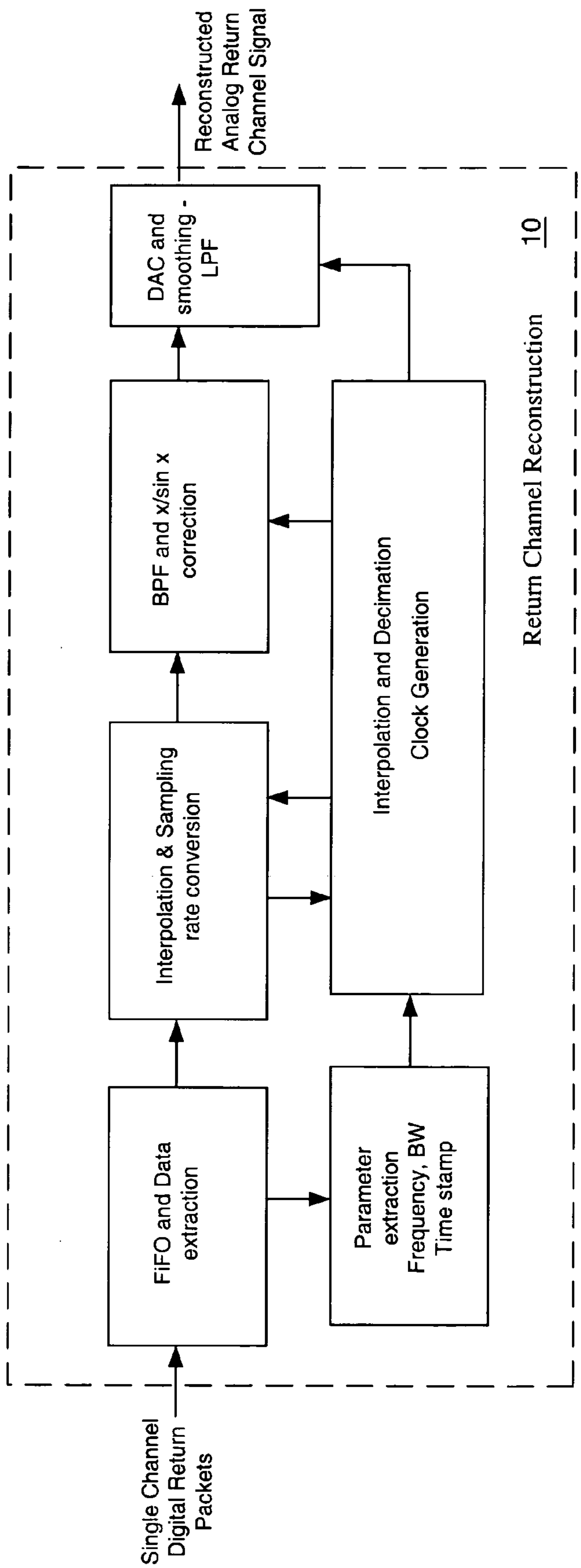
FIG. 10 provides internal detail of the Return Channel Reconstruction block of FIG. 9.

At the Head-end, as shown in FIG. 7A, FIG. 9, and FIG. 10, a reverse process (discussed in detail below) performs extraction and reconstruction of an exact replica of the legacy signal(s) both in frequency position and bandwidth. The reconstructed signals may then be submitted to the appropriate legacy equipment for demodulation and data retrieval. This combination of digitization, framing, and integration with other upstream packet traffic in accordance with the present invention, does not increase the complexity of the upstream receivers and provides a substantial reduction in data transfer requirements (e.g., by a factor of 10) compared to digitizing the entire upstream spectrum.

MAC Layer Functional Overview

In an illustrative embodiment, the mFN/mini-CMTS of FIG. 3A implements all the MAC functions interfaces required to be fully compliant to DOCSIS 1.0. The mFN/mini-CMTS is intended to be software upgradeable to DOCSIS 1.1. MAC layer functions beyond those required by DOCSIS are also provided to support at least two Legacy channels, with respective MIBs and Messages.

Figure 11:
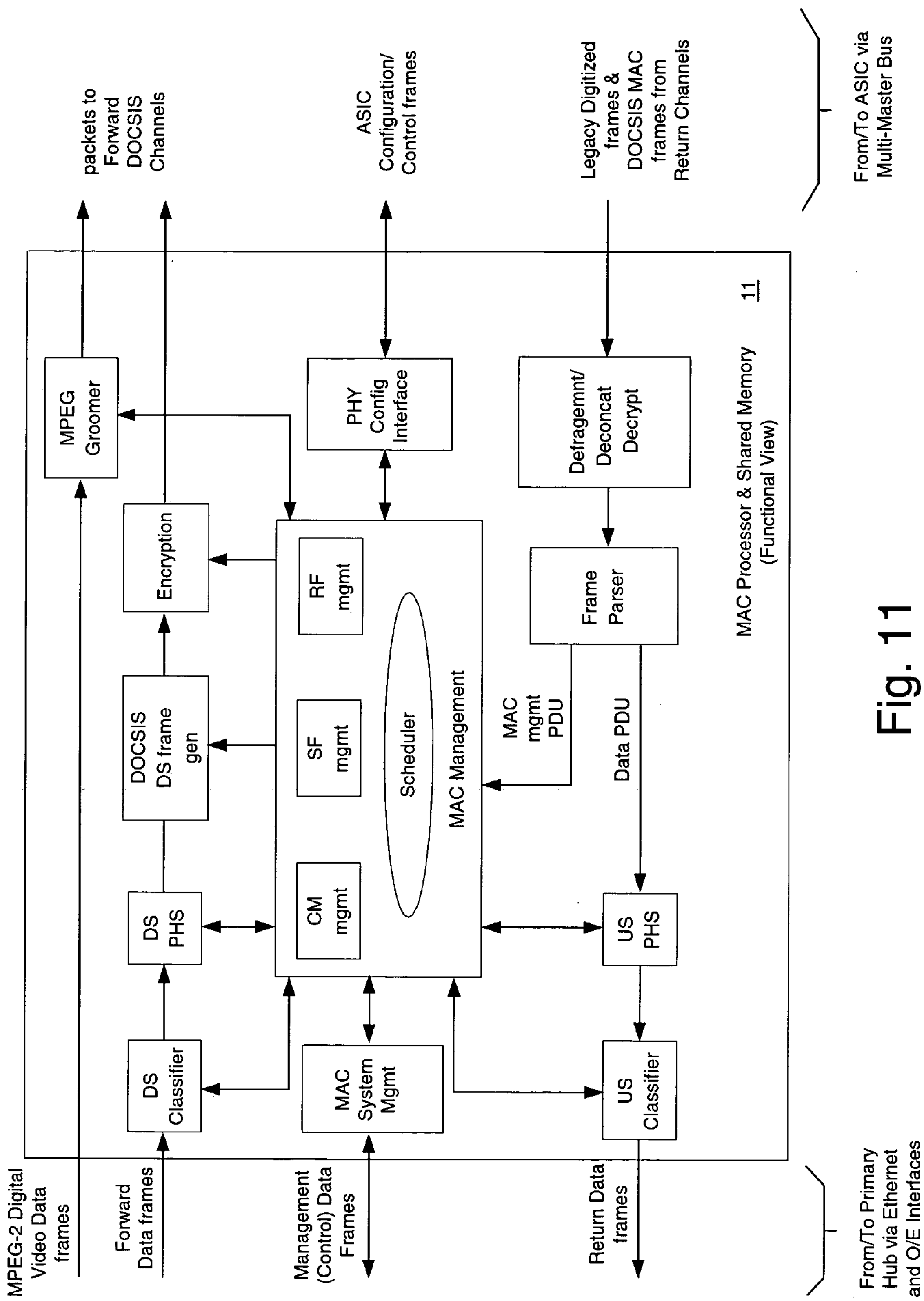
FIG. 11 illustrates the relationship between MAC functions in the Mac processor and shared memory of FIG. 3A.

FIG. 11 illustrates the MAC functions performed by the MAC Processor and Shared Memory. These functions include: PHY configuration and monitoring; de-fragmentation, de-concatenation, and decryption; MAC management; CM management; Service Flow (SF) management; scheduler; RF management; Upstream (US) and Downstream (DS) Classifier; Upstream (US) and Downstream (DS) Payload Header Suppression (PHS); encryption; security based on the DOCSIS Baseline Privacy [BPI] and Baseline Privacy Plus [BPI+] specifications; DOCSIS DS frame generation; and CMTS MAC system management.

DOCSIS requires the mini-CMTS to support various functions and protocol layers above the MAC sublayer. These are listed in table 4, below.

TABLE 4

DOCSIS functions implemented in a preferred embodiment

| Function Type | Examples within Type |
|---|---|
| Forwarding and filtering | Layer 2 Packet Forwarding, Packet Filtering |
| Network-layer protocols | IGMP, ICMP |
| Higher-layer functions | TFTP, DHCP, TOD, RSVP, RTP, COPs, DNS, RADIUS |

TABLE 4-continued

| DOCSIS functions implemented in a preferred embodiment | |
|---|---|
| Function Type | Examples within Type |
| CMTS management | CM Directory, SNMP, CLI |
| Network Side Interface (NSI) | WAN and MPEG interfaces |

The mini-CMTS is required to perform the following functions as part of managing itself: initialization and power on self-test; fault and performance monitoring; diagnostics; alarming via LEDS and the command line interface; and background maintenance functions.

Microprocessor and Transport Interfaces (Ethernet I/F)

FIG. 3C provides detail of the underlying structure for the MAC processor and shared memory of FIG. 3A. The strict physical limitations of the mFN/mini-CMTS require a solution that is low-power and highly integrated, but capable of supplying the significant computational horsepower and I/O bandwidth required by the Real Time Operating System (RTOS) and MAC functionality. In a preferred embodiment, a Motorolla MPC8260 PowerQUICCC II is used. This versatile communications processor integrates on to a single chip a high-performance PowerPC RISC microprocessor, a very flexible system integration unit, and multiple communication peripheral controllers. The latter are configured as Ethernet interfaces for communication with the cable system Head End.

The MPC8260 includes an EC603e, an embedded variant of the PowerPC 603e microprocessor having no floating-point processor. The EC603e includes 16 KB of level-one instruction cache and 16 KB of level-one data cache. Software running on the EC603e implements the following functions: ranging; registration; UCD message generation UCC, BPKM, and DSx protocol processing; and MAP message generation.

The MPC8260 further includes an integrated communications processor module (CPM), which is an embedded 32-bit processor using a RISC architecture to support several communication peripherals. The CPM interfaces to the PowerPC core through an on-chip 24 Kbyte dual-port RAM and DMA controller. Using a separate bus, the CPM does not affect the performance of the PowerPC core. The CPM handles the lower MAC layer tasks and DMA control activities, leaving the PowerPC core free to handle higher MAC layer and ASIC related MAC activities. More specifically, the CPM implements the following functions: downstream/upstream Classifier, PHS, traffic shaping, forwarding and filtering. The CPM contains three fast communication controllers (FCCs), each including support for a 10/100-Mbit Ethernet/IEE 802.3 CDMS/CS interface through a media independent interface. Two 100 Mbps Ethernet interfaces are implemented in this manner, for the packet communications with the cable system Head End.

The MPC8260 further includes a system interface unit (SIU), which includes a flexible memory controller usable with many memory system types (e.g. DRAM, FPDRAM, SDRAM, etc . . . ), a 60x bus, a programmable local bus, and the on chip communications processor module. In an illustrative embodiment, PC66 SDRAM is used for the main memory. There are three memory types used in the illustrative embodiment. As shown in FIG. 3C, a 4 MB SDRAM is attached as local RAM, between 16 and 64 MB of SDRAM is attached to the multi-master 60x bus as shared RAM, and between 8 and 32 MB of Flash memory is coupled (via buffers) to the multi-master 60x bus, as shared NV Memory. The 4 MB SDRAM operates at 66 MHz, is 32-bits wide, and is intended for use exclusively by the CPM to buffer descriptors for the communication channels or raw data that is transmitted between channels. The 16–64 MB SDRAM operates at 66 MHz, is 64-bits wide, and is intended for use by either the EC603e or bus mastered accesses by the DSP Multi-Channel Transceiver ASIC. The 8–32 MB Flash includes storage for the operating system and applications. All memory is soldered down to the supporting PCB to improve reliability.

In a preferred embodiment, a front-side bus, level two, (FSB L2) cache is used in conjunction with the MPC8260. An MPC2605 integrated secondary cache device is used. The MPC2605 is a single chip, 256 KB integrated look-aside cache with copy-back capability. The MPC2605 integrated data, tag, and host interface uses memory with a cache controller to provide a 256 KB level 2 cache. At 66 MHz, the MPC2605 supports zero wait state performance and 2-1-1-1 burst transfers. Without the optional cache, an auxiliary PowerPC processor may be necessary to provide the needed computational capability of the MAC functions.

The interface between the MAC Processor and the DSP Multi-Channel Transceiver ASIC is the 60x bus. This bus interface supports 66 MHz operation, 64-bit wide data path, burst transfers and bus mastering arbitration. The MPC8260 is configured for "60x compatible mode" and not "Single bus mode". Configured in this mode, the MPC8260 can support one or more bus masters and the level-two cache. The 60x bus is used in pipeline mode for increased performance, requiring some additional external logic.

Optical Network and Ethernet Interface.

FIG. 3A and FIG. 3C are relevant to the following discussion of the Optical-to-Electrical (O/E) interface. The CPM of the MPC8260 couples to the O/E interface via an LX970A (a product of Level One, Inc.). The LX970A is a 10/100 Mbps Fast Ethernet PHY Transceiver that provides a Media Independent Interface (MII) for attachment to the CPM and a pseudo-ECL interface for use with 100BASE-FX fiber modules to the Head End fiber interface. As shown in FIG. 3A, three fibers provide connectivity between the mFN/mini-CMTS and the SH (and/or Head End). Each fiber carries up to several wavelengths corresponding to various downstream channels or upstream bursts from multiple mFNs.

Other Features of the Mini-CMTS

In a preferred embodiment the following features further characterize the mini-CMTS:

a) fully digital downstream implementations of Annex B coding and modulation;
b) fully digital upstream implementation of DOCSIS modulated upstream channels, including direct IF sampling, digital baseband conversion, and parallel demodulation of at least 2 channels;
c) parallel digitization of 2 frequency bands containing at least 2 legacy packetized digital return channels (PDC);
d) frequency agility in the total upstream band;
e) fully flexible receiver to allow performance optimization vs. noise and intersymbol interference (all DOCSIS channel parameters, burst profiles & user profiles), with features including variable symbol rate, variable burst length, Reed-Solomon decoding with variable error correction capability and variable code rate, and both QPSK & 16-QAM demodulation (with extensions to 32- & 64-QAM);

f) accurate power, timing & carrier offset estimation;
g) fully digital, non-data aided symbol clock recovery;
h) joint blind and decision-directed channel equalization;
i) fully digital carrier phase/frequency recovery;
j) fast and aliasing free frame lock technique;
k) transform based area/timing efficient extended Reed-Solomon decoder;
l) single cycle Galois field arithmetic elements (inverters, multipliers, adders/subtractors);
m) digital carrier synthesis supporting on-the-fly frequency selection;
n) variable rate interpolator supporting multiple upstream symbol rates; and
o) adjustable transmit level and local time reference.

System Environment

FIGS. 7A and 7B illustrate the system environment for an HFC cable system having a packet fiber overlay using mFN/mini-CMTSs, in accordance with the present invention. FIG. 7A is a view that focuses on the relationship between the head-end and the customer premises. FIG. 7B is a view that focuses on the relationship between the cable-system head-end and other networks. FIG. 8 illustrates an alternate embodiment for an HFC cable system having a packet fiber overlay using mFN/mini-CMTSs, in accordance with the present invention.

Reconstruction of Legacy Upstream Channels at the Head End

In order to assure proper demodulation of the legacy return signals, it is necessary to reconstruct each upstream signal precisely at its original carrier frequency. FIG. 10 provides detail of this process. The context for these functional blocks includes FIG. 9 and FIG. 7A.

Reconstruction of the original signal requires performing steps that are the reverse of the sampling and decimation process performed in the mFN/mini-CMTS. Based on information either known in advance (e.g., the decimation ratio provisioned for the channel) or included in the Ethernet encapsulated frames (the mID, CID, CTRL and SEQ parameters; describing the upstream signal origin, BW and frequency), it is straightforward to reconstruct and upsample to generate an exact replica of the digitized sample stream provided to the front-end of the mFN/mini-CMTS.

These samples are fed into a D/A converter whose clock is running synchronously to the A/D converter in the mFN/mini-CMTS. The reconstructed signal is thus placed precisely on the proper carrier frequency. The required clock synchronicity can by achieved by a number of means, including e.g. FIFO fullness control and timestamp messaging. The particular method of clock synchronicity is determined at least in part by the degree of short-term absolute frequency precision required by the legacy demodulator/receiver equipment.

FIG. 9 and FIG. 7A provide additional detail showing how multiple instances of the Return Channel Reconstruction logic 10 are implemented within the Master DAC Controller 9, at the Head End. The Master DAC Controller 9 provides extraction and reconstruction of each packetized digital return channel (PDC). Each legacy signal is reconstructed independently and delivered to a corresponding receiver. It is also possible to combine several analog reconstructed signals for delivery over a single coaxial cable to a common legacy demodulator/receiver.

End-to-End Operation of the Packetized Digital Return Channel (PDC)

In conjunction with the A/D(s) 9010 and front-ends 6000, a Legacy Digitizing Framer and Return DSP 15 (located inside each of multiple mini-CMTSs) isolates digitized return channels specified by the Master DAC Controller 9 (located at a cable Head End or SH), encapsulates the associated bit stream into Ethernet packets, and transmits the packets over the regional packet network. (The digitization and packet encapsulation formats are described below.) These packets are forwarded to the distribution hubs and Head End. Since these packets are encapsulated using an Ethernet frame format, standard switches (and routers) can be used to aggregate and relay the traffic.

At the Head End, the Master DAC Controller 9 extracts the bit streams from the Ethernet frames and recovers the analog channels. The Master DAC Controller 9 also controls and monitors the Legacy Digitizing Framer and Return DSP 15 within each of multiple remote mini-CMTS. In a preferred embodiment, the Master DAC Controller 9 can control up to 216 Digitizing Framers.

Each framer is assigned an IP address and a 16-bit unique identifier (mFN Station ID). The Master DAC Controller 9 communicates with the framers via SNMP. At initialization, the Master DAC Controller configures the framer to select different channels. In an illustrative embodiment, each Legacy Digitizing Framer and Return DSP 15 is capable of supporting four analog channels. The channels can be configured independently. However, these channels should not overlap in frequency. The Characteristics of each Packetized Digital Return Channel (PDC) are given in Table 5, below.

TABLE 5

Channel Characteristics

| Characteristic | Definition |
|---|---|
| Channel ID | a unique 16-bit identifier specifying the channel |
| Frequency | the center frequency of the channel, in Hertz |
| Width | the bandwidth of the channel, in Hertz |
| Frame Length | number of data bytes in each frame |
| Resolution | number of bits per analog sample |

Each frame/packet is uniquely identified by the fields shown in Table 6, below.

TABLE 6

Frame Field Definitions

| Field | Length | Description |
|---|---|---|
| mID (or IP addr) | 16 bits | mFN Station ID |
| CD | 8 bits | Channel ID |
| CTRL | 8 bits | Control |
| SEQ | 16 bits | Sequence Number |

Data Encapsulation for the Packetized Digital Return Channel

At the mini-CMTS, the selected analog channels are digitized into streams of bits. These bits are encapsulated into frames. In an illustrative embodiment, the Digitizing Framer provides both a Layer 2 encapsulation mode and a Layer 3 encapsulation mode.

Since Layer 2 frames carry only LAN address information, only switches and transparent bridges can forward them. Therefore, regular IP routers cannot be used to forward the Layer 2 frames at the distribution hubs and Head End, as these frames do not have any IP information. The advantage of using Layer 2 encapsulation is bandwidth efficiency. Since the frames do not have any IP/UDP headers, the framing is very efficient especially for short packets. The amount of overhead per frame is 26 bytes (Ethernet)+6 bytes (PDC)=32 bytes.

Since Layer 3 frames are encapsulated in UDP packets, they are forwarded and routed using standard switches and routers. This would allow the Master DAC Controller to be located at different IP subnets. With Layer 3 encapsulation, the amount of overhead per frame is 26 bytes (Ethernet)+20 bytes (IP)+8 bytes (UDP)=54 bytes.

Layer 2 Encapsulation

Implementation of a "best efforts" upstream data channel using point-to-point layer 2 protocol is summarized as follows. The 5–42 MHz US spectrum is digitized, filtered and decimated to provide a data stream corresponding to the desired channel. The data stream is packetized in Ethernet frames and transmitted using layer 2 protocol to the Master DAC controller 9 (located in the Head End). Each frame is identified by mFN-ID, channel-ID and Payload control (using SA and DA). The Master DAC Controller 9 will reconstruct the original legacy signal(s) at the Head End (with the original frequency and bandwidth). The Master DAC Controller 9 will provide the resulting legacy flows to legacy equipment for subsequent demodulation. Also using layer 2 protocol over the downstream path, the Master DAC Controller 9 sends control commands to specific mFNs as required to implement provisioning and configuration of each mini-CMTS.

With Layer 2 encapsulation, the bit streams are encapsulated into Ethernet frames as shown in FIG. 5. The source address and destination address of the frames are the hardware addresses of the Digitized Framer and Master Controller, respectively. A Packetized Digital Return Channel (PDC) header is inserted to uniquely identify each frame. The PDC header includes four fields: mID is the mFN Station ID of the associated Framer, CID is the Channel ID of the analog channel and CTRL contains control bits and reserved bits. SEQ is the byte sequence number and identifies the byte in the stream of data from the Framer to the Master Controller that the first byte of data in this frame represents.

Layer 3 Encapsulation

Implementation of a "best efforts" upstream data channel using a point-to-point UDP/layer 3 protocol is summarized as follows. The 5–42 MHz US spectrum is digitized, filtered and decimated to provide a data stream corresponding to the desired channel. The data stream is encapsulated in UDP packets and transmitted using layer 3 protocol to the Master DAC controller 9 (located in the Head End). Each frame is identified using the source port number (mFN-ID, channel-ID and Payload control). The Master DAC Controller 9 will reconstruct the original legacy signal(s) at the Head End (with the original frequency and bandwidth). The Master DAC Controller 9 will provide the resulting legacy flows to legacy equipment for subsequent demodulation. Using TCP, the Master DAC Controller 9 also sends control commands from the Head End Management System (HMS) to specific source port numbers in order to implement provisioning and configuration of each mini-CMTS.

With Layer 3 encapsulation, the bit streams are encapsulated in UDP packets as shown in FIG. 6. In the IP header, the source IP address and the destination IP address are the IP addresses of the transmitting framer and the Master Controller, respectively. The source UDP port number (SP) is used to represent CID and CTRL while the default destination UDP port number is 3103. Since the packet size is constant (set by SNMP), the UDP packet length field is used to represent the SEQ field.

Control and Monitoring of Legacy Digitizing Framer

The parameters for each channel's framer are configured via SNMP. The attributes for each analog channel are detailed in Table 7, below.

TABLE 7

Channel Table MIB

| MIB | Access | Syntax | Description |
|---|---|---|---|
| Channel ID | RW | Integer32 (0 . . . 255) | Identifier of this channel |
| Frequency | RW | Integer32 (0 . . . 1 000 000 000) | Center frequency of this channel in Hertz |
| Width | RW | Integer32 (0 . . . 10 000 000) | Bandwidth of this channel in Hertz |
| Power | RO | Integer32 | Received Power in tenth of dBmV |
| Length | RW | Integer32 (64 . . . 1518) | Length of Packets in Bytes |
| Resolution | RW | Integer32 (8 . . . 12) | Number of Bits per analog sample |

Since SNMP is a best effort delivery protocol, the Master DAC controller is responsible for guarantying the retrieval of the setting of the channel attributes. An ARQ approach is used to ensure the framers are configured with the correct setting:

```
While (true) {
        Configure the Framer using SNMP SET
        Read the configuration of the Framer via SNMP GET
        If (Correct setting)
                Break
        Wait a few seconds
}
```

In the above approach, the DAC controller would repeatedly transmit SNMP SET commands until the corresponding channel is set up correctly.

We claim:

1. A method of transferring the contents of an information channel from a source to a destination, the method comprising:

providing at the source an analog spectrum having a plurality of channels via a first analog path;

digitizing the analog spectrum, resulting in a digitized spectrum;

isolating, from the digitized spectrum, a selected channel;

translating the selected channel to baseband, resulting in a digitized channel;

framing the digitized channel and associated attribute information, resulting in a framed channel;

transmitting the framed channel to the destination using packet techniques over a second packet network distinct from the first analog path; and reconstructing a frequency and bandwidth accurate replica of the received framed channel, resulting in a reconstructed replica of the selected channel at the destination.

2. The method of claim 1, further wherein the framed channel is merged with other digital services during transmission over the network.

3. The method of claim 1, further including demodulating the reconstructed replica at the destination.

4. The method of claim 3, wherein the selected channel corresponds to a telephone service.

5. The method of claim 1, wherein the source is a subscriber.

6. The method of claim 1, wherein the destination is a headend.

7. The method of claim 1, wherein the frames are Ethernet frames.

8. The method of claim 7, wherein the frames are Ethernet frames packetized using a Layer 2 protocol.

9. The method of claim 7, wherein the frames are Ethernet frames packetized using a Layer 3 protocol.

10. The method of claim 1, wherein the plurality of channels are DOCSIS channels.

11. The method of claim 1, wherein the associated attribute information includes channel-ID and payload control information.

12. A system for transferring contents of an information channel from a source to a destination, comprising:

means for receiving a signal spectrum having a plurality of channels via an analog network;

means for digitizing the received signal spectrum;

means for isolating and translating, from the digitized spectrum, a selected channel to baseband, resulting in a digitized channel;

means for framing the digitized channel and associated attribute information;

means for transmitting the framed channel to the destination using packet techniques over a second packet network; means for reconstructing a frequency and bandwidth accurate replica of the selected channel at the destination.

13. The system of claim 12, wherein the source is a subscriber and the destination is a headend.

14. The system of claim 12, wherein the frames are Ethernet frames.

* * * * *

UNITED STATES PATENT AND TRADEMARK OFFICE

CERTIFICATE OF CORRECTION

PATENT NO. : 6,993,016 B1 Page 1 of 1
DATED : January 31, 2006
INVENTOR(S) : Liva et al.

It is certified that error appears in the above-identified patent and that said Letters Patent is hereby corrected as shown below:

<u>Column 18,</u>
Line 6, claim 12 should read as follows:

12. A system for transferring contents of an information channel from a source to a destination, comprising:

means for receiving a signal spectrum having a plurality of channels via an analog network;

means for digitizing the received signal spectrum;

means for isolating and translating, from the digitized spectrum, a selected channel to baseband, resulting in a digitized channel;

means for framing the digitized channel and associated attribute information;

means for transmitting the framed channel to the destination using packet techniques over a second packet network; and means for reconstructing a frequency and bandwidth accurate replica of the selected channel at the destination.

Signed and Sealed this

Fourth Day of April, 2006

JON W. DUDAS

*Director of the United States Patent and Trademark Office*